United States Patent
Fujii et al.

(10) Patent No.: US 11,637,625 B2
(45) Date of Patent: Apr. 25, 2023

(54) INTERFERENCE CANCELING BY VARIABLE DIVISION OF FEEDER LINK TRANSMISSION BAND IN MULTIPLE-GATEWAY HAPS SYSTEM

(71) Applicant: HAPSMobile Inc., Tokyo (JP)

(72) Inventors: Takafumi Fujii, Tokyo (JP); Teruya Fujii, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/442,178

(22) PCT Filed: Feb. 13, 2020

(86) PCT No.: PCT/JP2020/005481
§ 371 (c)(1),
(2) Date: Sep. 23, 2021

(87) PCT Pub. No.: WO2020/202820
PCT Pub. Date: Oct. 8, 2020

(65) Prior Publication Data
US 2022/0190908 A1    Jun. 16, 2022

(30) Foreign Application Priority Data
Mar. 29, 2019   (JP) .............................. JP2019-067707

(51) Int. Cl.
*H04B 7/185*    (2006.01)
*H04B 7/212*    (2006.01)

(52) U.S. Cl.
CPC ....... *H04B 7/18504* (2013.01); *H04B 7/2125* (2013.01)

(58) Field of Classification Search
None
See application file for complete search history.

(56) References Cited

U.S. PATENT DOCUMENTS

| 9,825,693 B1 | 11/2017 | Siegrist et al. |
| 10,305,580 B1 * | 5/2019 | Lee ...................... H04B 7/0626 |

(Continued)

FOREIGN PATENT DOCUMENTS

| JP | 2002-534901 A | 10/2002 |
| JP | 2010-109745 A | 5/2010 |

(Continued)

OTHER PUBLICATIONS

Takafumi Fujii, et al., "A Study on Interference Reduction for Feeder Link in Multiple Gateways HAPS System," B-5-23, Mar. 19, 2019.

(Continued)

*Primary Examiner* — Shripal K Khajuria
(74) *Attorney, Agent, or Firm* — Muirhead and Saturnelli, LLC

(57) ABSTRACT

While suppressing a power consumption of an aerial-floating type communication relay apparatus, an interference in a multi-feeder link of a same frequency between the communication relay apparatus and plural gateway (GW) stations is suppressed. A relay communication station of the communication relay apparatus performs a first interference suppression process and a second interference suppression process by switching therebetween. The first interference suppression process suppresses an interference signal that causes an interference by a transmission signal transmitted from a gateway station and received with a directional beam corresponding to another gateway station, by using a propagation path response estimated with one frequency in a transmission signal band as an estimation frequency based on a reception result of a pilot signal without dividing a transmission signal band of a feeder link. The second interference suppression process divides a transmission signal band of a feeder link into plural divided frequency bands, (Continued)

and suppresses the interference signal by using a propagation path response estimated with one frequency in the divided frequency band as an estimation frequency based on a reception result of a pilot signal, for each of the divided frequency bands.

14 Claims, 34 Drawing Sheets

(56) References Cited

U.S. PATENT DOCUMENTS

| | | |
|---|---|---|
| 2007/0072603 A1 | 3/2007 | Wang |
| 2008/0090575 A1* | 4/2008 | Barak ............... H04W 92/20 370/310 |
| 2009/0010238 A1* | 1/2009 | Barak ............... H04L 5/0051 370/342 |
| 2016/0046387 A1 | 2/2016 | Frolov et al. |
| 2018/0309536 A1 | 10/2018 | Jacquey et al. |

FOREIGN PATENT DOCUMENTS

| | | |
|---|---|---|
| JP | 2014-123897 A | 7/2014 |
| WO | WO 2019/064363 A1 | 4/2019 |

OTHER PUBLICATIONS

Takafumi Fujii, et al., "A Study of Efficient Spectrum for Use for Feeder Link in HAPS System," B-5-40, Sep. 11, 2018.

Takafumi Fujii, et al., "A Study on Efficient Spectrum Utilization for Feeder Link using Multiple Gateways HAPS System," The Institute of Electronics Information and Communication Engineers, IEICE Technical Report, RCS2018-203, Nov. 2018.

Takafumi Fujii, et al., "A study on efficient spectrum utilization for feeder link using multiple gateway in HAPS system," HAPS Mobile Inc., IEICE Technical Report, Denshi Jouhou Tsuushin Gakkai, JP, vol. 118, No. 311 RCS2018-203, Nov. 13, 2018, pp. 143-148, XP009524055, ISSN: 0913-5685.

Takafumi Fujii, et al., "A study on feeder link interference reduction for multi-gateway HAPS system," Lecture Proceedings of The 2019 General Conference of IEICE, IEICE, JP Mar. 5, 2019, p. 289, XP009524085, URL:https://www.ieice-taikai.jp/2019general/jpn/webpro/_html/cs.html.

* cited by examiner

INTERFERENCE CANCELING BY VARIABLE DIVISION OF FEEDER LINK TRANSMISSION BAND IN MULTIPLE-GATEWAY HAPS SYSTEM

TECHNICAL FIELD

The present invention relates to an interference canceling in a multi-feeder link of an aerial-floating type radio relay apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

CITATION LIST

Patent Literature

Patent Literature 1: U.S. Patent Application Publication No. 2016/0046387.

SUMMARY OF INVENTION

Technical Problem

Since a communication capacity of the service link of the aerial-floating type communication relay apparatus (hereinafter referred to as "upper-air relay apparatus") depends on a communication capacity of a feeder link which is a relay frequency, effective use of feeder link frequencies is essential. Therefore, a method is conceivable in which plural GW stations on the ground are installed at locations separated from each other to form a multi-feeder link that transmits and receives different feeder link signals on the same frequency from each GW station. However, unlike the fixed station, the upper-air relay apparatus flies around in a predetermined airspace, so that a dynamic interference may occur in the multi-feeder link of the same frequency between the upper-air relay apparatus and the plural GW stations.

Solution to Problem

A system according to an aspect of the present invention is a system comprising an aerial-staying type communication relay apparatus including a relay communication station that relays a radio communication of a terminal apparatus. The system comprises plural gateway stations that are time-synchronized with each other and transmit and receive relay signals different from each other on a same frequency in feeder links between the relay communication station of the aerial-staying type communication relay apparatus and the plural gateway stations. The relay communication station comprises a feeder-link communication section that transmits and receives relay signals different from each other on the same frequency in the feeder links to and from the plural gateway stations, and an interference suppression section that suppresses interference between plural feeder links formed with the plural gateway stations. Each of the plural gateway stations transmits a pilot signal, the feeder-link communication section receives the pilot signals respectively transmitted from the plural gateway stations, and separates each of the received plural pilot signals with a filter. The interference suppression section performs a first interference suppression process and a second interference suppression process by switching therebetween. The first interference suppression process suppresses an interference signal that causes an interference by a transmission signal transmitted from the gateway station and received with a directional beam corresponding to another gateway station, by using a propagation path response estimated with one frequency in the transmission signal band as an estimation frequency based on a reception result of the pilot signal without dividing a transmission signal band of the feeder link. The second interference suppression process divides the transmission signal band of the feeder link into plural divided frequency bands and suppresses the interference signal by using a propagation path response estimated with one frequency in the divided frequency band as an estimation frequency based on the reception result of the pilot signal for each of the divided frequency bands.

A relay communication station according to another aspect of the present invention is a relay communication station that is incorporated in an aerial-staying type communication relay apparatus and relays a radio communication of a terminal apparatus. The relay communication station comprises a feeder-link communication section that transmits and receives relay signals different from each other on a same frequency in feeder links between the feeder-link communication section and plural gateway stations that are time-synchronized with each other, and an interference suppression section that suppresses interference between plural feeder links formed with the plural gateway stations. The feeder-link communication section receives pilot signals respectively transmitted from the plural gateway stations, and separates each of the received plural pilot signals with a filter. The interference suppression section performs a first interference suppression process and a second interference suppression process by switching therebetween. The first interference suppression process suppresses an interference signal that causes an interference by a transmission signal transmitted from the gateway station and received with a directional beam corresponding to another gateway station, by using a propagation path response estimated with one frequency in the transmission signal band as an estimation frequency based on a reception result of the pilot signal without dividing a transmission signal band of the feeder link. The second interference suppression process divides the transmission signal band of the feeder link into plural divided frequency bands and suppresses the interference signal by using a propagation path response estimated with one frequency in the divided frequency band as an estimation frequency based on the reception result of the pilot signal for each of the divided frequency bands.

An aerial-staying type communication relay apparatus according to yet another aspect of the present invention comprises the foregoing relay communication station.

An interference suppression method according to yet another aspect of the present invention is a feeder-link interference suppression method in a relay communication station that is incorporated in an aerial-staying type communication relay apparatus and relays a radio communication of a terminal apparatus. The interference suppression method includes receiving pilot signals respectively transmitted from plural gateway stations time-synchronized with each other, and separating each of the received plural pilot signals with a filter. Further, the interference suppression method includes performing a first interference suppression process and a second interference suppression process by switching therebetween. The first interference suppression process suppresses an interference signal that causes an interference by a transmission signal transmitted from the gateway station and received with a directional beam corresponding to another gateway station, by using a propagation path response estimated with one frequency in the transmission signal band as an estimation frequency based on a reception result of the pilot signal without dividing a transmission signal band of the feeder link. The second interference suppression process divides the transmission signal band of the feeder link into plural divided frequency bands and suppresses the interference signal by using a propagation path response estimated with one frequency in the divided frequency band as an estimation frequency based on the reception result of the pilot signal, for each of the divided frequency bands.

A program according to yet another aspect of the present invention is a program executed by a computer or a processor installed in a relay communication station that is incorporated in an aerial-staying type communication relay apparatus and relays a radio communication of a terminal apparatus. The program includes a program code for transmitting and receiving relay signals different from each other on a same frequency in feeder links between the relay communication station and plural gateway stations that are time-synchronized with each other, a program code for receiving pilot signals respectively transmitted from the plural gateway stations, a program code for separating each of the received plural pilot signals with a filter. Further, the program includes a program code for performing a first interference suppression process and a second interference suppression process by switching therebetween. The first interference suppression process suppresses an interference signal that causes an interference by a transmission signal transmitted from the gateway station and received with a directional beam corresponding to another gateway station, by using a propagation path response estimated with one frequency in the transmission signal band as an estimation frequency based on a reception result of the pilot signal without dividing a transmission signal band of the feeder link. The second interference suppression process divides the transmission signal band of the feeder link into plural divided frequency bands and suppresses the interference signal by using a propagation path response estimated with one frequency in the divided frequency band as an estimation frequency based on the reception result of the pilot signal, for each of the divided frequency bands.

In the foregoing system, the foregoing relay communication station, the foregoing aerial-staying type communication relay apparatus, the foregoing interference suppression method and the foregoing program, the first interference suppression process may be performed in normal times, and the first interference suppression process may be switched to the second interference suppression process when an SINR of the feeder link deteriorates or when the deterioration of SINR of the feeder link is predicted.

In the foregoing system, the foregoing relay communication station, the foregoing aerial-staying type communication relay apparatus, the foregoing interference suppression method and the foregoing program, the feeder-link communication section may comprise an antenna for feeder link capable of performing a beamforming that changes an angle of the directional beam, and the interference suppression section may switch from the first interference suppression process to the second interference suppression process, when an angle change of the directional beam of the antenna for feeder link by the beamforming becomes equal to or more than a predetermined threshold value.

In the foregoing system, the foregoing relay communication station, the foregoing aerial-staying type communication relay apparatus, the foregoing interference suppression method and the foregoing program, the interference suppression section may switch from the first interference suppression process to the second interference suppression process, when a reception level ratio between the plural pilot signals transmitted from the plural gateway stations becomes equal to or less than a predetermined threshold value.

In the foregoing system, the foregoing relay communication station, the foregoing aerial-staying type communication relay apparatus, the foregoing interference suppression method and the foregoing program, the interference suppression section may calculate plural eigenvalues of the propagation path response estimated based on the reception results of the plural pilot signals, and switch from the first interference suppression process to the second interference suppression process when at least one of the plural eigenvalues becomes equal to or less than a predetermined threshold value. Further, the interference suppression section may switch from the first interference suppression process to the second interference suppression process, when an angle at which a main beam direction of the directional beam of the antenna for feeder link deviates from a direction facing a target gateway station becomes equal to or more than a predetermined threshold value.

In the foregoing system, the foregoing relay communication station, the foregoing aerial-staying type communication relay apparatus, the foregoing interference suppression method and the foregoing program, the plural divided frequency bands may be defined by equally dividing the transmission signal band of the feeder link, or may be frequency bands defined by unequally dividing the transmission signal band of the feeder link according to a distribution of the interference signals in the transmission signal band of the feeder link.

In the foregoing system, the foregoing relay communication station, the foregoing aerial-staying type communication relay apparatus, the foregoing interference suppression method and the foregoing program, the pilot signals may be plural, and the plural pilot signals may be distributed and transmitted in plural guard bands located on both sides of the transmission signal band of the feeder link.

In the foregoing system, the foregoing relay communication station, the foregoing aerial-staying type communication relay apparatus, the foregoing interference suppression method and the foregoing program, each of the plural weights may be calculated by the ZF (Zero-Forcing) method or the MMSE (Minimum Mean Square Error) method using matrix of the propagation path response.

In the foregoing system, the foregoing interference suppression method and the foregoing program, each of the plural gateway stations may comprise an antenna control section that controls an antenna for feeder link so as to track the aerial-staying type communication relay apparatus.

In the foregoing system, the foregoing aerial-staying type communication relay apparatus, the foregoing interference suppression method and the foregoing program, the aerial-staying type communication relay apparatus may comprise an antenna for feeder link having plural directional beams corresponding to each of the plural gateway stations, and an antenna control section for controlling the antenna for feeder link so that each of the plural beams directs toward a corresponding gateway station.

Advantageous Effects of Invention

According to the present invention, it is possible to suppress interference in a multi-feeder link of a same frequency between an aerial-floating type communication relay apparatus and plural gateway stations, while suppressing a power consumption of the communication relay apparatus.

DESCRIPTION OF EMBODIMENTS

Hereinafter, embodiments of the present invention are described with reference to the drawings.

Figure 1:
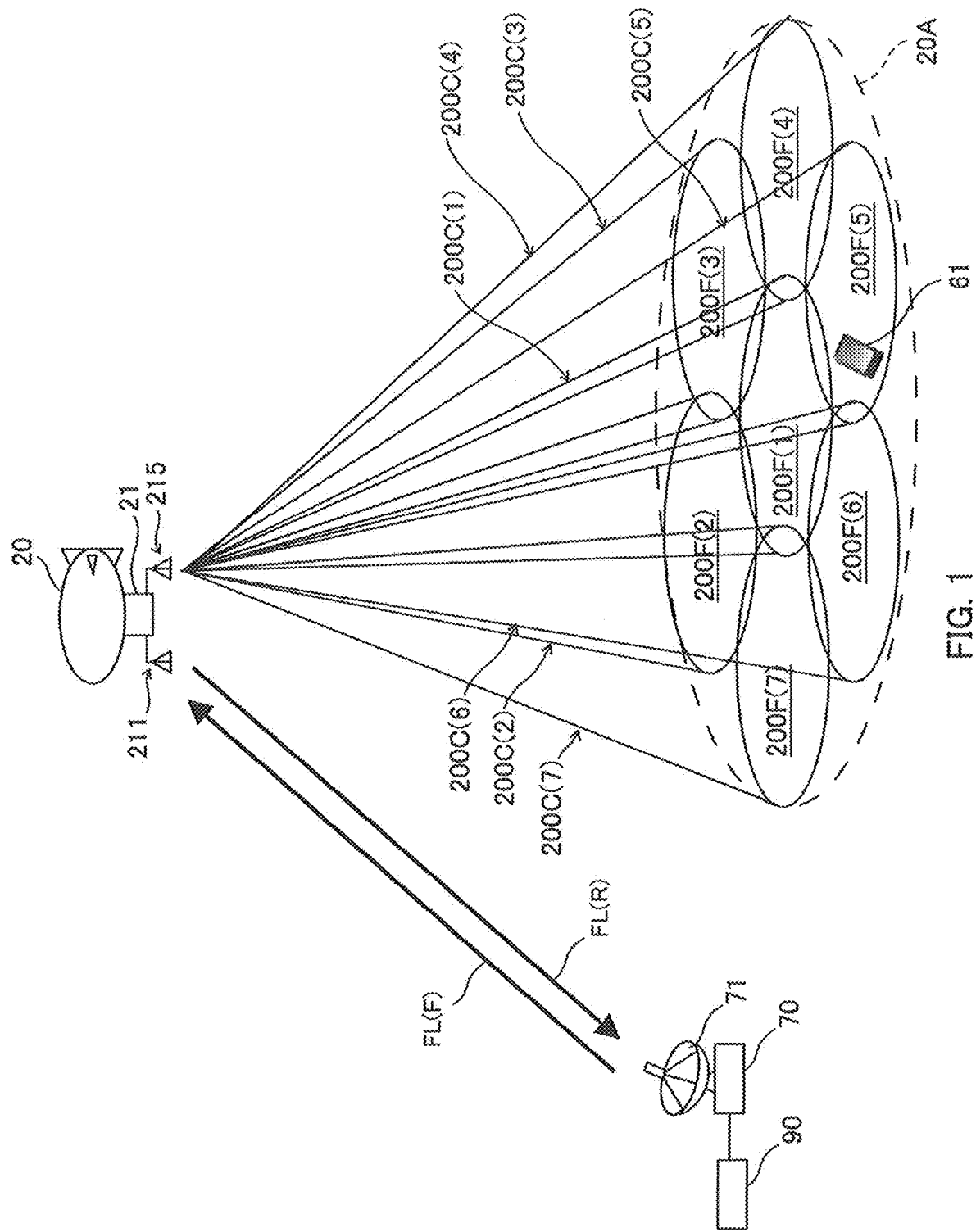
FIG. 1 is an illustration showing an example of a HAPS cell configuration in a communication system according to an embodiment of the present invention.

FIG. 1 is an illustration showing an example of a cell configuration of HAPS 20 in a communication system according to an embodiment of the present invention. The communication system according to the present embodiment is suitable for realizing a three-dimensional network of fifth-generation mobile communication that supports simultaneous connection to a large number of terminal apparatuses, and low delay, etc.

As shown in FIG. 1, the communication system is provided with High-Altitude Platform Stations (HAPS) (also called "high altitude pseudo satellite" or "stratified platform") 20 as plural aerial-floating type communication relay apparatuses (radio relay apparatuses). The HAPS 20 is located in an airspace at a predetermined altitude, and forms three-dimensional cell (three-dimensional area) in a cell-formation target airspace at a predetermined altitude. The HAPS 20 is an airship as a floating object that is controlled by autonomous control or external control so as to float or fly and be located in an airspace (floating airspace) with high altitude of 100 [km] or less from the ground level or the sea level, and a relay communication station 21 is mounted on the airship.

The airspace in which the HAPS 20 is located is, for example, a stratospheric airspace with altitude greater than 11 [km] and less than 50 [km] on the ground (or on the water such as the sea or lake). The airspace may be an airspace in an altitude of 15 [km] or more and 25 [km] or less where weather conditions are relatively stable, and may be an airspace with altitude of about 20 [km] in particular.

The cell-formation target airspace, which is a target airspace for forming a three-dimensional cell with one or two or more HAPSs according to the communication system in the present embodiment, is an airspace in a predetermined altitude range (for example, altitude range of 50 [m] or more and 1000 [m] or less) located between the airspace where the HAPS 20 is located and a cell-formation spatial area near the ground level covered by a base station (for example, LTE eNodeB) such as a conventional macro-cell base station.

It is noted that, the cell-formation target airspace where the three-dimensional cell in the present embodiment is formed may be an airspace over the sea, a river or a lake. Further, the three-dimensional cell formed by the HAPS 20 may be formed so as to reach the ground level or the sea level so that it can communicate with a terminal apparatus 61 located on the ground or on the sea.

The relay communication stations of the HAPS 20 respectively form plural beams for wirelessly communicating with the terminal apparatus 61 that is a mobile station, toward the ground by an antenna for service link (hereinafter referred to as "SL antenna") 215. The terminal apparatus 61 may be a communication terminal module incorporated in a drone that is an aircraft such as a small helicopter capable of remotely steering, or may be a user apparatus used by a user in an airplane. An area through which the beam passes in the cell-formation target airspace is a three-dimensional cell. The plural beams adjacent to each other in the cell-formation target airspace may be partially overlapped with each other.

Each of the relay communication stations 21 of the HAPS 20 is, for example, a base station that wirelessly communicates with a gateway station (also referred to as a "feeder station") 70 as a relay station connected to a core network on the ground (or on the sea) side, or a slave repeater that wirelessly communicates with the feeder station (master repeater) 70 as a relay station connected to a base station on the ground (or on the sea) side.

The relay communication station 21 of the HAPS 20 is connected to a core network of a mobile communication network 80 via the feeder station 70, which is installed on the ground or on the sea, capable of radio communication by an antenna for feeder link (hereinafter referred to as "FL antenna") 211. A communication of feeder link between the HAPS 20 and the feeder station 70 may be performed by a radio communication using a radio wave such as a microwave, or may be performed by an optical communication using a laser light or the like.

Each of the HAPS 20 may autonomously control its own floating movement (flight) and a process in the relay communication station 21 by executing a control program with a control section including a computer or the like incorporated inside of the HAPS. For example, each of the HAPS 20 may acquire its own current position information (for example, GPS position information), position control information (for example, flight schedule information) stored in advance, position information on another HAPS located in a peripheral space or the like, and may autonomously control floating movement (flight) and process in the relay communication station 21 based on these pieces of information.

Further, the floating movement (flight) of each of the HAPS 20 and the process in the relay communication station 21 may be controlled by a management apparatus (also referred to as a "remote control apparatus") as a management apparatus provided in a communication center or the like of the mobile communication network. The management apparatus can be configured with, for example, a computer apparatus such as a PC, a server, or the like. In this case, the HAPS 20 may incorporate a communication terminal apparatus for control (for example, mobile communication module) so that it can receive control information from the management apparatus and transmit various pieces of information such as monitoring information to the management apparatus, and may be assigned terminal identification information (for example, IP address, phone number, etc.) so that it can be identified from the management apparatus. The MAC address of the communication interface may be used to identify the communication terminal apparatus for control.

Moreover, each of the HAPS 20 may transmit information regarding the floating movement (flight) of the own HAPS or a surrounding HAPS and/or the process at the relay communication station 21, and monitoring information such as information on statuses of the HAPS 20 and observation data acquired by various kinds of sensors, to a predetermined destination such as the management apparatus. The control information may include information on target flight route of the HAPS. The monitoring information may include at least one of information on current positions, flight-route history information, velocity relative to the air, velocity relative to the ground and propulsion direction of the HAPS 20, wind velocity and wind direction around the HAPS 20, and atmospheric pressure and temperature around the HAPS 20.

Duplex methods of uplink and downlink for radio communication with the relay communication station 21 and the terminal apparatus 61 are not limited to specific methods, and may be, for example, a time division duplex method (Time Division Duplex: TDD) or a frequency division duplex method (Frequency Division Duplex: FDD). An access method for radio communication with the relay communication station 21 and the terminal apparatus 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time/same frequency, and may be an MU-MIMO (Multi-User MIMO) technology in which one base station transmits signals to plural different communication terminal apparatuses on the same time/same frequency or plural different base stations transmit signals to one terminal apparatus on the same time/same frequency.

It is noted that, in the following embodiments, although it is illustrated and described regarding some cases in which a communication relay apparatus having the relay communication station 21 that wirelessly communicates with the terminal apparatus 61 is an unmanned airship type HAPS 20, the communication relay apparatus may be a solar-plane type HAPS. Further, the following embodiments can be similarly applied to aerial-floating type communication relay apparatuses other than the HAPS.

A link between the HAPS 20 and a base station 90 via a gateway station (hereinafter abbreviated as "GW station") 70 as a feeder station is referred to as a "feeder link", and a link between the HAPS 10 and the terminal apparatus 61 is referred to as a "service link". In particular, a spatial section between the HAPS 20 and the GW station 70 is referred to as a "radio section of feeder link". Further, a downlink of a communication from the GW station 70 to the terminal apparatus 61 via the HAPS 20 is referred to as a "forward link", and an uplink of a communication from the terminal apparatus 61 to the GW station 70 via the HAPS 20 is also referred to as a "reverse link".

In FIG. 1, although the communication relay apparatus is the unmanned-airship type HAPS 20, it may be a solar-plane type HAPS. Further, in the illustrated example, although the HAPS 20 is located in the stratosphere with an altitude of about 20 km, the HAPS 20 forms plural cells 200C(1) to 200C(7), and a diameter of a service area 20A consisting of footprints 200F(1) to 200F(7) of the cells 200C(1) to 200C(7) of the plural cells (7 cells) configuration is 100 to 200 km, it is not limited to these examples.

Figure 9:
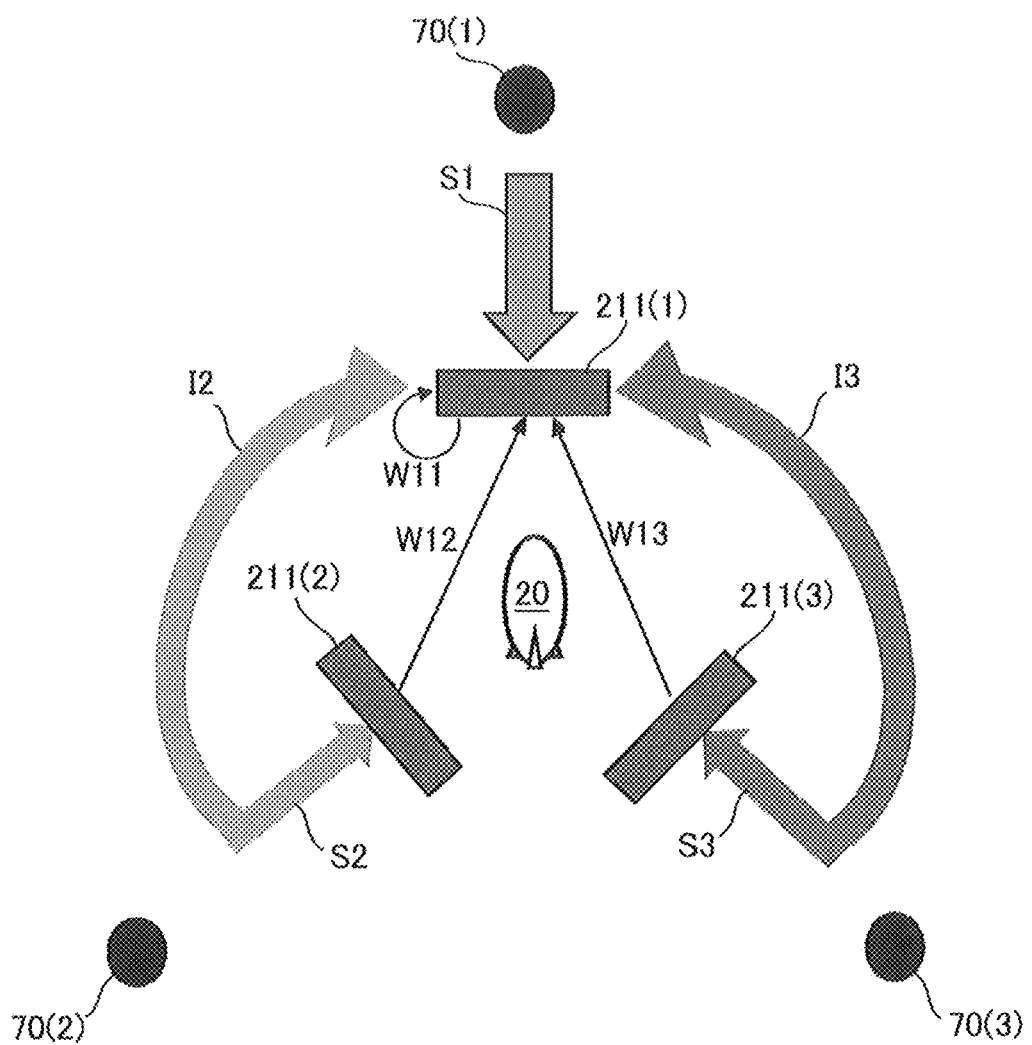
FIG. 9 is an illustration showing an example of a MIMO interference canceller applied by obtaining the weight W by an approximate expression.

In FIG. 1, a communication service that directly communicates with the terminal apparatus 61 on the ground (or on the water) using the HAPS 20 located in the stratosphere is very attractive as an expansion of service area and a communication means in the event of a disaster. The communication line of the HAPS 20 comprises a feeder link FL connecting the GW station 70 and the HAPS 20, and a service link SL connecting the HAPS 20 and the terminal apparatus 61. Since the communication capacity of the service link depends on the communication capacity of the feeder link which is the relay frequency, it is necessary to improve the frequency utilization efficiency of the feeder link. In particular, in case that the service link has a multi-cell configuration as shown in FIG. 9, the communication capacity of the feeder link tends to be insufficient, so that a frequency effective utilization technology for the feeder link is indispensable. However, in case that the HAPS 20 and the GW station 70 are configured one-to-one, it is difficult to improve the frequency utilization efficiency of the feeder link.

Therefore, in the present embodiment, a plural-gateway system (hereinafter also referred to as "plural-GW system") is constructed, which is configured with plural GW stations that transmit and receive relay signals different from each other on a same frequency to and from the HAPS 20 in the feeder link, and performs a spatial-division multiplex communication in a multi feeder link formed between one HAPS 20 and plural GW stations. In the plural-GW system, by eliminating interference between the plural feeder links, the frequency utilization efficiency can be improved depending on the number of GW stations to be installed.

It is noted that, in the following embodiments, although it is described regarding some cases in which the spatial-division multiplex communication between the HAPS 20 and the plural GW stations is performed only by a forward link of the feeder link, the spatial-division multiplex communication may be performed only by a reverse link of the feeder link, or may be performed by both of the forward link and the reverse link.

Figure 2B:
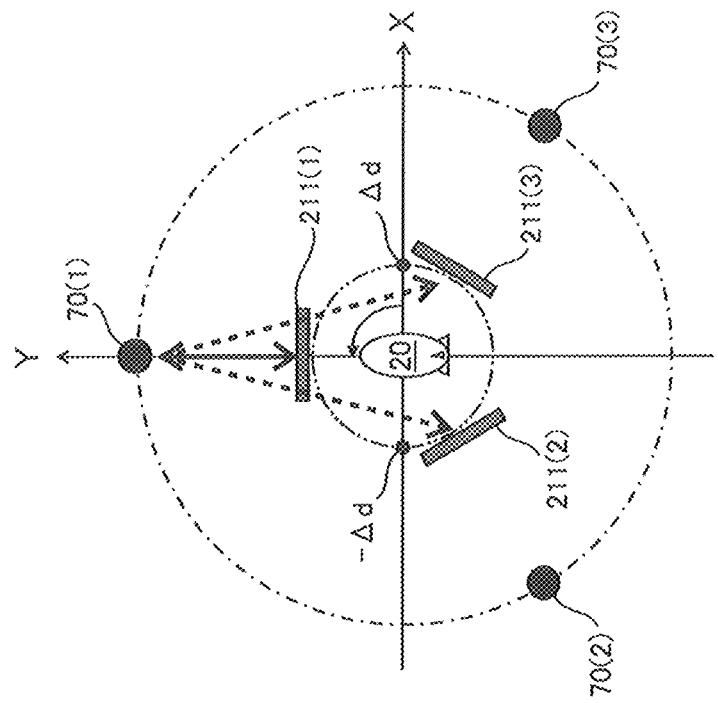
FIG. 2B is a top view illustration of a relationship between plural antennas for feeder link of a HAPS and plural GW stations.
Figure 2A:
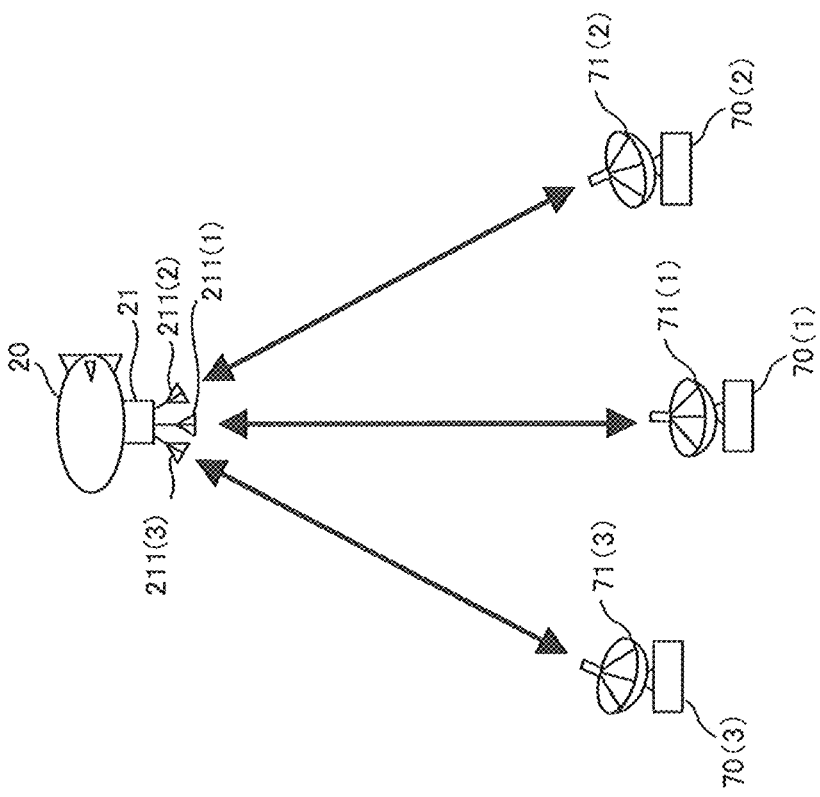
FIG. 2A is a side view showing an example of a schematic configuration of plural GW systems according to the embodiment.

FIG. 2A is a side view showing an example of a schematic configuration of plural GW systems according to the embodiment, and FIG. 2B is a top view illustration of a relationship between plural FL antennas 211(1) to 211(3) of the HAPS 20 and plural GW stations 70(1) to 70(3). In the illustrated example, each of the number of FL antennas (N) and the number of GW stations (N) is the same number (3 in the illustrated example), and the same number of FL antennas 211(1) to 211(3) and GW stations 70(1) to 70(3) are provided in a one-to-one correspondence with each other. The number of sets of the FL antenna 211 and the GW station 70 may be two sets, or may be four or more sets. Further, in the illustrated example, although the plural GW stations 70 are disposed so that distances from the HAPS 20 and intervals between the GW stations are equal to each other, at least one of the distances and the intervals may be different from each other. Each GW station 70 is disposed so that complex amplitudes received by each FL antenna 211 (also referred to as "HAPS station antenna") of the HAPS 20 are uncorrelated. Further, the antennas for feeder link (hereinafter referred to as "GW antennas") 71(1) to 71(3) of the GW stations 70(1) to 70(3) can transmit and receive radio signals with two kinds of polarized waves of vertically polarized waves (V) and horizontally polarized waves (H) which are orthogonal to each other. In the illustrated example, although the plural FL antennas 211(1) to 211(3) of the HAPS 20 are disposed so that distances from the center of the HAPS 20 and intervals between the FL antennas are equal to each other, at least one of the distances and the intervals may be different from each other between the FL antennas. For example, the distances and the intervals may be different from each other between the FL antennas.

Figure 3:
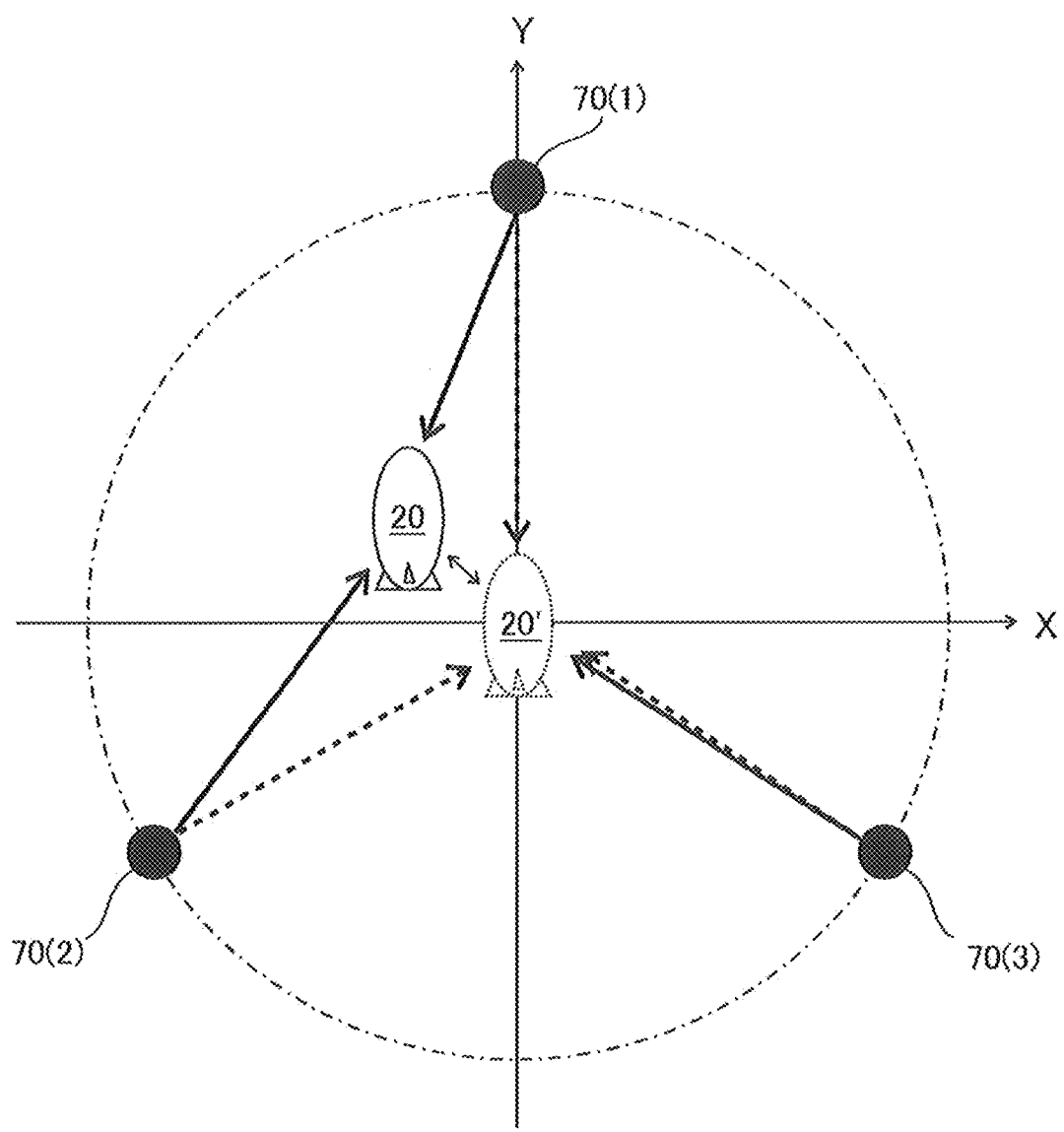
FIG. 3 is an illustration showing an example of state in which GW antennas of plural GW stations are tracking a HAPS according to the embodiment.

As shown in FIG. 3, each of the plural GW stations 70(1) to 70(3) may include an antenna control section that controls the GW antennas 71(1) to 71(3) so as to track the HAPS 20 moving in an airspace. A HAPS 20' with dashed lines in the figure indicates a position before the movement, and a solid line HAPS 20 in the figure indicates a position after the movement. By tracking the HAPS 20 by each of the GW antennas 71(1) to 71(3), even when using the GW antennas 71(1) to 71(3) with high directivity such as a parabolic antenna, it is capable of suppressing the deterioration of the communication quality of the feeder link due to the movement of the HAPS 20.

Figure 4:
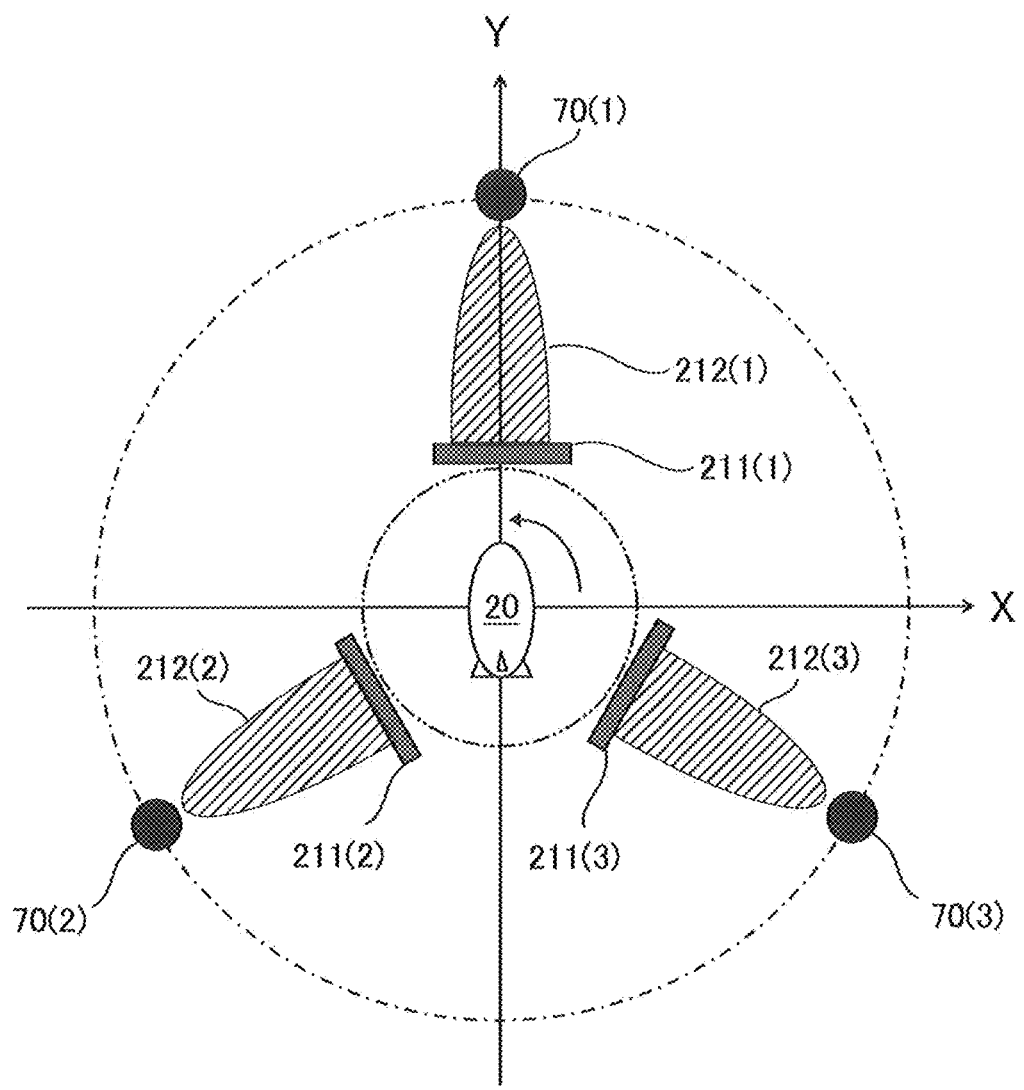
FIG. 4 is an illustration showing an example of directional beams of plural FL antennas of a HAPS according to the embodiment.

As shown in FIG. 4, the plural FL antennas 211(1) to 211(3) of the HAPS 20 may include antenna directional beams (hereinafter referred to as "directional beams" or "beams") 212(1) to 212(3) respectively corresponding to the GW stations 70(1) to 70(3), and the HAPS 20 may include an antenna control section that controls the FL antennas 211(1) to 211(3) so that the directional beams 212(1) to 212(3) of the plural FL antennas 211(1) to 211(3) is respectively directed in the direction of the corresponding GW stations 70(1) to 70(3). Each of the directional beams 212(1) to 212(3) of the FL antennas 211(1) to 211(3) is formed, for example, so as to face the GW station 70 closest to itself and not to provide interferences to other GW stations, that is, so that a ratio (F/B) of a gain of the main beam and a gain in the opposite direction becomes sufficiently large. As a result, even when the HAPS 20 moves or rotates, it is possible to suppress the deterioration of the communication quality of the feeder link due to the movement and rotation of the HAPS 20.

As a control system of the directional beams 212(1) to 212(3) of the plural FL antennas 211(1) to 211(3) by the antenna control section of the HAPS 20, it is capable of using various systems such as a gimbal system, an electric system (360-degrees beamforming control system), and an electric system (angle-limited beamforming control system+ antenna switching).

Figure 5:
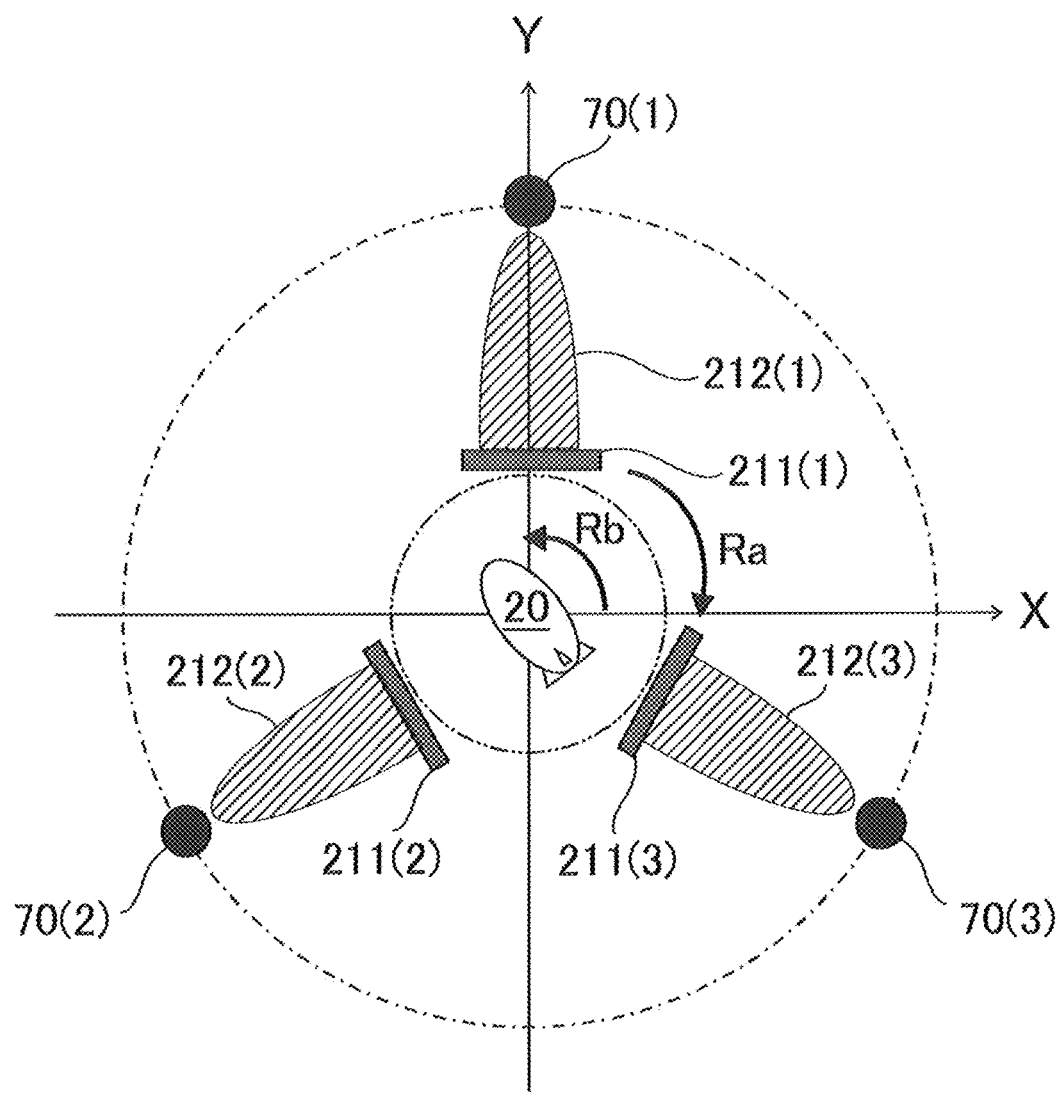
FIG. 5 is an illustration showing an example of a directional beam control of FL antennas in a HAPS according to the embodiment.

For example, in the gimbal system in FIG. 5, in accordance with the rotation (turning) around the vertical axis (yawing axis, Z axis) of the HAPS 20, the rotation drive of the whole of plural FL antennas 211(1) to 211(3) can be mechanically controlled around the foregoing axis. For example, in FIG. 5, when the HAPS 20 rotates about 45 degrees in the left direction of rotation (counterclockwise direction) Rb, the rotation of the whole of plural FL antennas 211(1) to 211(3) are mechanically driven in the right direction of rotation (clockwise direction) Ra opposite to the foregoing direction of rotation of the HAPS 20.

Although the rotational drive control for angle adjustment of each of the FL antenna 211(1) to 211(3) may be performed with reference to information on a position and an orientation of the HAPS, the rotational drive control of respective FL antenna 211(1) to 211(3) may be performed with reference to reception level values of the FL antennas 211(1) to 211(3). For example, each FL antenna 211(1) to 211(3) is rotated in small steps, an angle for maximizing the reception level of each of the FL antenna 211(1) to 211(3) is found, and the rotational drive control of each of the FL antenna 211(1) to 211(3) is performed so as to face the angle. Herein, a threshold value may be set for each of the reception levels of each of the FL antenna 211(1) to 211(3), each of the FL antenna 211(1) to 211(3) may be rotated by a predetermined angle when the reception level falls below the foregoing threshold, and the rotational drive control of the FL antenna 211(1) to 211(3) may be performed to the directional angle at which the reception level is maximized. The threshold value of the reception level may be obtained, for example, by an experiment in advance, and the predetermined angle may be, for example, 360 degrees/number of FL antennas (120 degrees in the illustrated example). Further, a monitoring beam for comparing the reception level from the GW stations other than the corresponding GW station may be generated from the FL antenna 211(1) to 211(3), a GW station having the maximum level may be selected, and the rotational drive of each of the FL antenna 211(1) to 211(3) may be controlled so that the directional beam is directed in the direction to the selected GW station.

It is noted that, although the angle adjustment in the horizontal direction of each of the FL antennas 211(1) to 211(3) is shown in FIG. 5, the angle adjustment in the vertical direction may be also performed in the same manner.

By the rotational drive control of the FL antennas 211(1) to 211(3), even if the HAPS 20 rotates, since the directional beams 212(1) to 212(3) of the FL antennas 211(1) to 211(3) are directed in the corresponding directions of the GW stations 70(1) to 70(3) respectively, the deterioration of the communication quality of the feeder link can be prevented.

Figure 6:
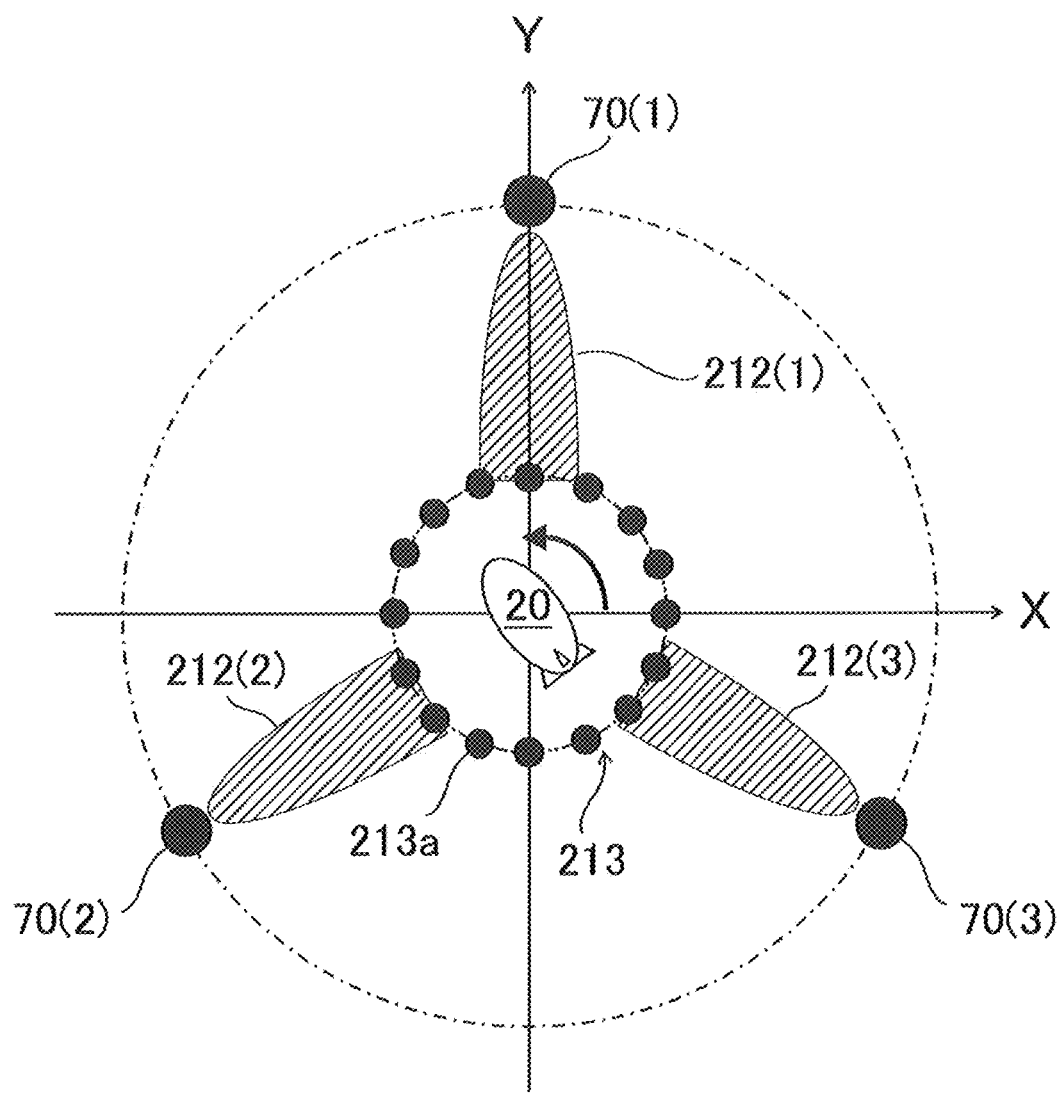
FIG. 6 is an illustration showing another example of a directional beam control of FL antennas in a HAPS according to the embodiment.

In the electric system (360-degrees beamforming control system) in FIG. 6, a circular array antenna 213 in which plural antenna elements 213a are disposed along the circumferential shape is provided as a FL antenna. Based on information on a position and an attitude of the HAPS 20, a weight applied to signals (amplitude, phase) transmitted and received via each of the plural antenna elements 213a is controlled. For example, the information on the position and the attitude of the HAPS 20 may be acquired based on an output of a GNSS Inertial Navigation System (GNSS/INS) that is a combination of a GNSS (Global Navigation Satellite System) system and an Inertial Measurement Unit (IMU) incorporated in the HAPS 20.

Although the weight control of each antenna element 213a of the circular array antenna 213 may be performed with reference to the information on the position and the attitude of the HAPS, the weight control of each antenna element 213a may be performed so as to form a directional beam having the maximum reception level at a directional position corresponding to each GW station with reference to the reception level value of each antenna element 213a of the circular array antenna 213. For example, a phase of each antenna element 213a of the circular array antenna 213 is changed in small steps, an angle for maximizing the reception level is found, and the weight control of each antenna element 213a is performed so that a beam is formed in the direction of the found angle. Further, a monitoring beam for comparing the reception level from the GW stations other than the corresponding GW station may be generated from the circular array antenna 213, a GW station having the maximum level may be selected, and a beam may be formed in the direction to the selected GW station.

It is noted that, although the beam angle adjustment in the horizontal direction is shown in FIG. 6, the beam angle adjustment may be also performed in the same manner in the vertical direction.

By controlling the weight of each antenna element 213a of the circular array antenna 213, the directional beams 212(1) to 212(3) respectively directed in the directions to the plural GW stations 70(1) to 70(3) are formed. As a result, even if the HAPS 20 rotates, since the directional beams 212(1) to 212(3) of the FL antennas 211(1) to 211(3) are directed in the corresponding directions to the GW stations 70(1) to 70(3) respectively, the deterioration of the communication quality of the feeder link can be prevented.

Figure 7:
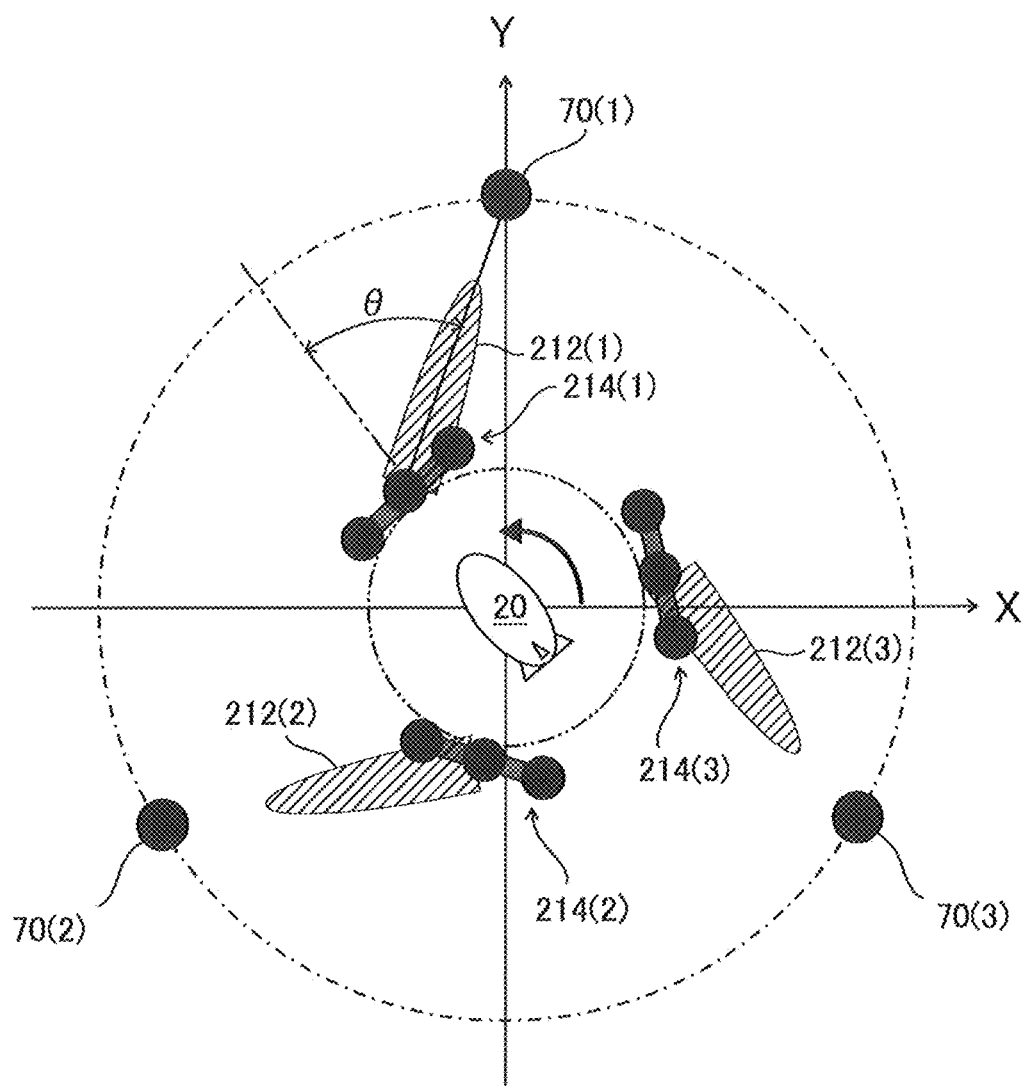
FIG. 7 is an illustration showing yet another example of a directional beam control of FL antennas in a HAPS according to the embodiment.

In the electric system (beamforming control system with limited angle+antenna switching) of FIG. 7, plural planar array antennas 214(1) to 214(3) in which plural antenna elements 214a of each array antenna are two-dimensionally disposed in a plane are provided as a FL antenna. Based on information on the position and the attitude of the HAPS 20 acquired by GNSS/INS etc., a beamforming control is performed to control a weight applied to a signal (amplitude, phase) transmitted and received via each of the plural antenna elements 214a of the plural planar array antennas 214(1) to 214(3).

Although the control of the switching and the beamforming of the planar array antennas 214(1) to 214(3) may be performed with reference to the information on the position and the attitude of the HAPS, the antenna switching and beamforming may be controlled so that each of the planar array antennas 214(1) to 214(3) has the maximum reception level with reference to the reception level value of each planar array antenna 214(1) to 214(3). For example, each of the planar array antenna 214 (1) to 214 (3) is rotated in small steps, an angle for maximizing the reception level of respective planar array antenna 214(1) to 214(3) is found, and the rotational drive control of each antenna is performed so as to be directed to the found angle. Herein, a threshold value may be set for each of the reception levels of each of the planar array antenna 214(1) to 214(3), when the reception level falls below the foregoing threshold value, the planar array antennas 214(1) to 214(3) may be switched and each of the planar array antenna 214(1) to 214(3) may be rotated by a predetermined angle, and a beamforming may be performed to form a beam to the directional angle at which the reception level is maximized. The threshold value of the reception level may be obtained, for example, by an experiment in advance, and the predetermined angle may be, for example, 360 degrees/number of FL antennas (120 degrees in the illustrated example). Further, a monitoring beam for comparing the reception level from the GW stations other than the corresponding GW station may be generated from the planar array antenna 214(1) to 214(3), a GW station, for which each of the planar array antenna 214(1) to 214(3) has the maximum level, may be selected, and an antenna switching and a beamforming may be performed so as to form a beam in the direction to the selected GW station.

It is noted that, although the beam angle adjustment in the horizontal direction is shown in FIG. 7, the beam angle adjustment may be also performed in the same manner in the vertical direction.

By controlling the switching and the beamforming of the planar array antennas 214(1) to 214(3), the directional beams 212(1) to 212(3) respectively directed in the directions to the plural GW stations 70(1) to 70(3) are formed. Herein, for example, when the angle (θ in the figure) at which the directional beam 212(1) is tilted with respect to the normal direction perpendicular to the plane of the planar array antenna 214(1) becomes larger than the preset predetermined angle θth degrees, the FL antenna corresponding to the GW station 70(1) is switched to the planar array antenna 214(2). As a result, even if the HAPS 20 rotates, each of the directional beams 212(1) to 212(3) of the FL antennas 211(1) to 211(3) are directed in the directions to the corresponding GW stations 70(1) to 70(3), so that the deterioration of the communication quality of the feeder link can be prevented.

Figure 8:
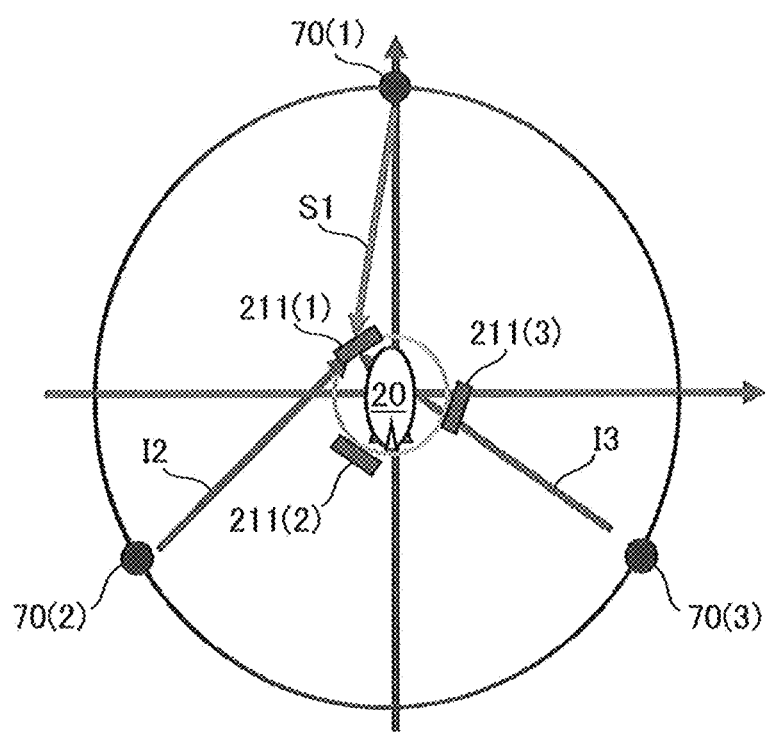
FIG. 8 is an illustration of an example of an interference between GW stations (between feeder links) in plural GW systems.

In the plural GW systems having the above-described configuration, interference between GW stations (between feeder links) may increase. For example, as shown in FIG. 8, while a desired signal (desired signal) S1 transmitted from the GW station 70(1) is received by the FL antenna 211(1) of the HAPS 20, signals transmitted from the other GW stations 70(2) and 70(3) are received by the FL antenna 211(1) as interference signals I2 and I3. Therefore, SINR characteristics of the feeder link may deteriorate.

Therefore, in the present embodiment, by applying a MIMO interference canceller supporting the line-of-sight environment (LOS: Line-Of-Sight) between the GW stations (between the feeder links) as shown below, and by reducing the interferences between the GW stations (between the feeder links), the SINR characteristics of the feeder link are improved.

Figure 10:
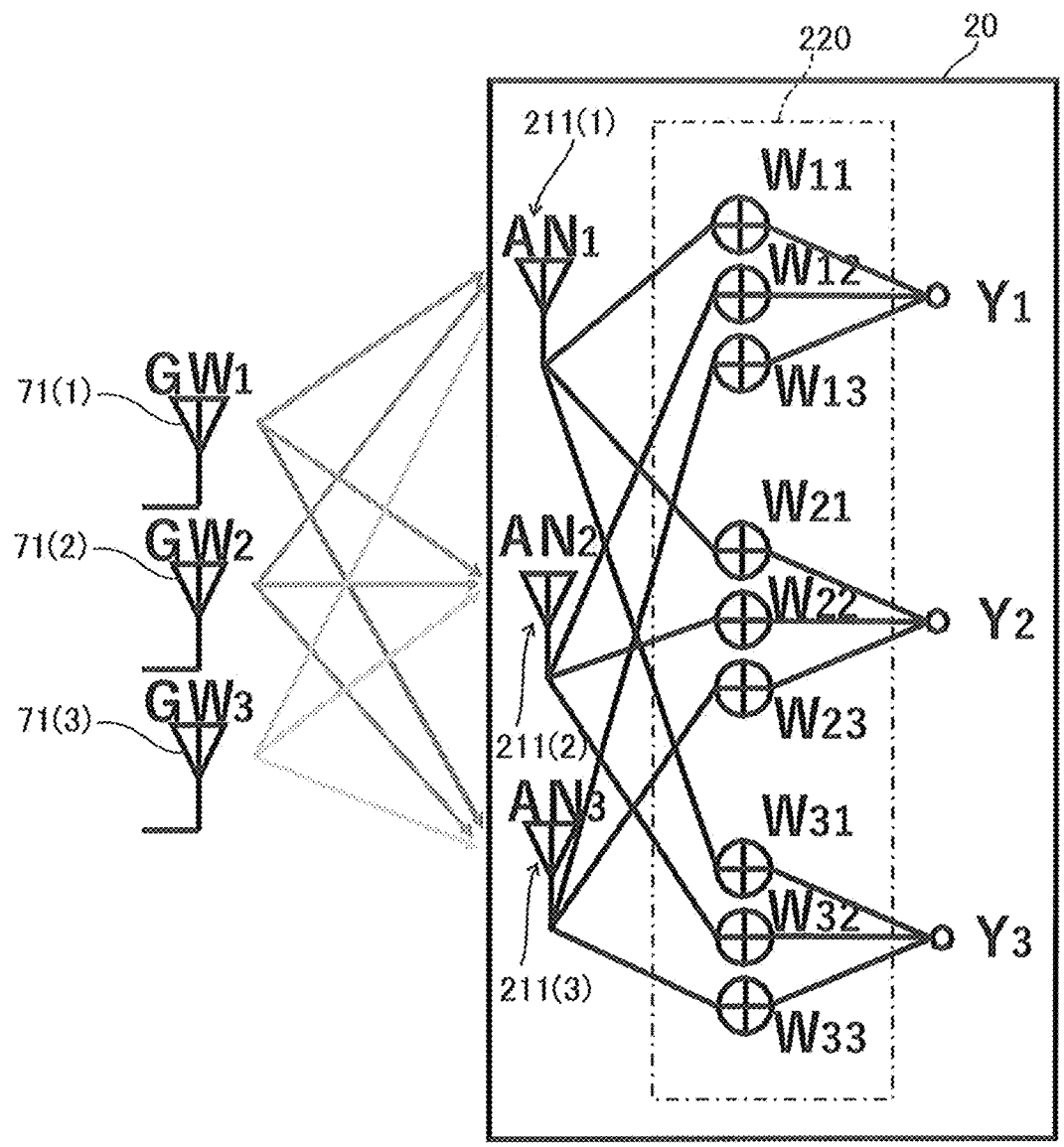
FIG. 10 is an illustration showing an example of a schematic configuration of an interference canceller section mounted on a HAPS.

FIG. 9 is an illustration showing an example of a MIMO interference canceller applied by obtaining the weight W by an approximate expression. FIG. 10 is an illustration showing an example of a schematic configuration of an interference canceller section 220 mounted on the HAPS 20.

The FL antenna 211(1) of the HAPS 20 receives a desired signal S1(Y11) transmitted from the GW station 70(1), an interference signal I2(Y12) transmitted from the GW station 70(2), and an interference signal I3(Y13) transmitted from the GW station 70(3). The reception signal AN1 is represented by the following equation (1).

$$AN1 = S1 + I2 + I3 \quad (1)$$

In the interference canceller section 220 of the HAPS 20, by multiplying and subtracting the weights W2 and W3 corresponding to the signals S2 and S3 respectively received by the other FL antennas 211(2) and 211(3) as shown in the following equation (2), the desired signal S1(Y11), in which the interference signals I2 and I3 are cancelled, can be output. Similarly, the interference signals from other GW stations can be canceled for the desired signals S2(Y22) and S3(Y33) transmitted from the GW stations 70(2) and 70(3).

$$S1 = W_{11} \cdot AN1 + w_{12} \cdot AN2 + W_{13} \cdot AN3 \quad (2)$$

Figure 11:
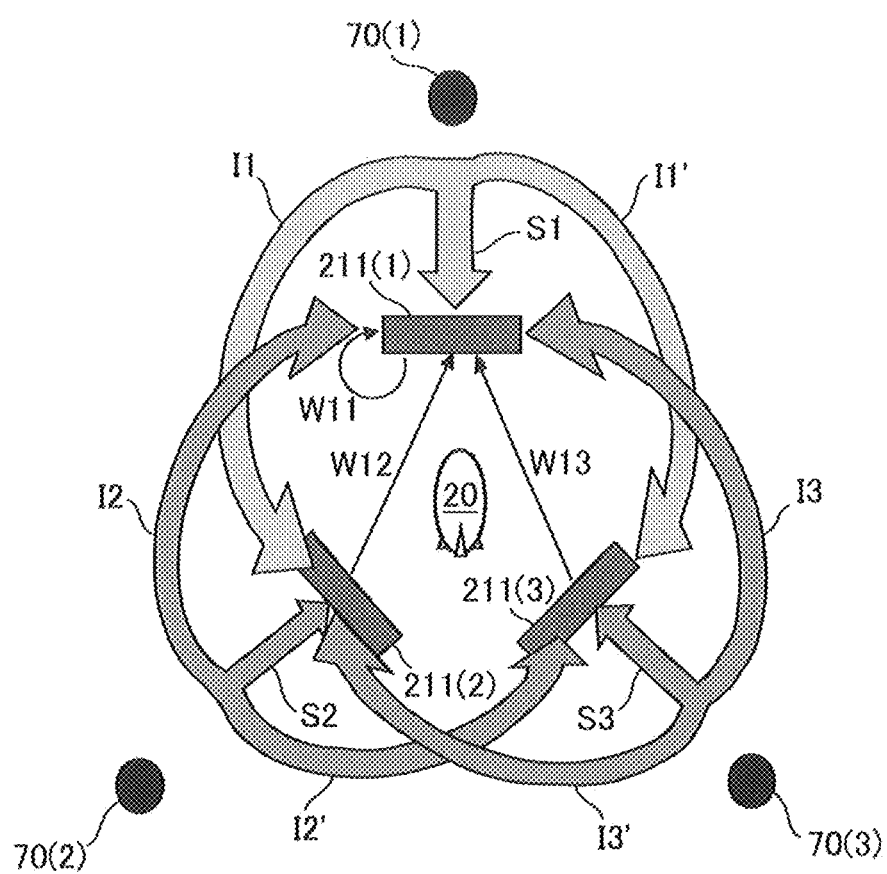
FIG. 11 is an illustration showing an example of a MIMO interference canceller applied by obtaining the weight W by the ZF method.

FIG. 11 is an illustration showing an example of a MIMO interference canceller applied by obtaining a weight W by the ZF (Zero-Forcing) method. For example, a signal transmitted from the GW station 70(1) is not only received as the desired signal S1(Y11) by the FL antenna 211(1) of the HAPS 20, but also received as interference signals I1(Y12) and I1'(Y13) by the FL antennas 211(2) and 211(3). Further, a signal transmitted from the GW station 70(2) is not only received as an interference signal I2(Y21) by the FL antenna 211(1), but also received as an interference signal I2'(Y23) by the FL antenna 211(3). Moreover, a signal transmitted from the GW station 70(3) is not only received as an interference signal I3(Y31) by the FL antenna 211(1), but also received as an interference signal I3'(Y32) by the FL antenna 211(2). In the MIMO interference canceller in FIG. 11, considering these interference signals I1, I1', I2' and I3', the desired signal S1(Y11) is output, for example, as shown in the following equation (3). As a result, the accuracy of interference suppression between the GW stations (between the feeder links) can be improved.

$$S1 = W_1(Y11+Y12+Y13) + W_{12}(Y21+Y22+Y23) + W_{13}(Y31+Y32+Y33) \quad (3)$$

In order to calculate the weight W used for the MIMO interference canceller, it is necessary to grasp a propagation path response H between the FL antennas 211(1) to 211(3) of the HAPS 20. In particular, in the plural GW systems in the present embodiment, since the airframe of the HAPS 20 moves relative to the GW stations 70(1) to 70(3), the propagation path response also changes in accordance with to the movement.

Figure 12:
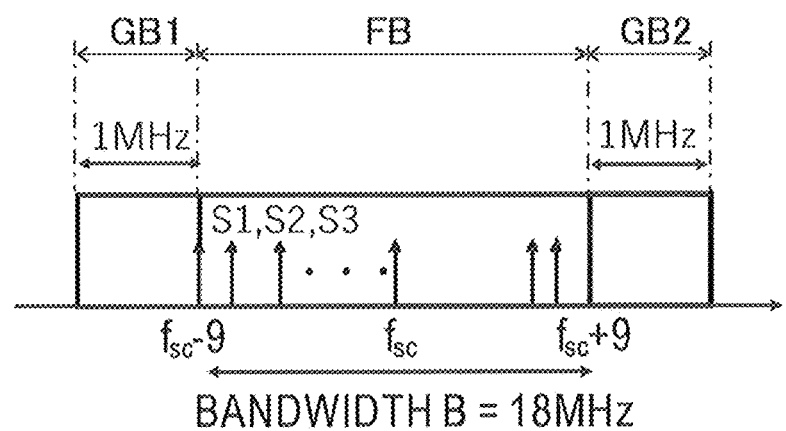
FIG. 12 is an illustration showing a reference example of a transmission signal band of a feeder link in the plural GW systems.

Therefore, in the present embodiment, a pilot signal is transmitted from each of the GW stations 70(1) to 70(3) in order to grasp the propagation path response. The frequency band of the pilot signal is a narrow band, and each pilot signal has a different transmission frequency from each other (orthogonal). The relay communication station 21 of the HAPS 20 estimates, for example, the propagation path response of the center frequency fsc (see fsc in FIG. 12) of the transmission signal band FB of the feeder link based on the pilot signal received from each of the GW stations 70(1) to 70(3), and derives the weight W.

The larger the difference between the frequency for obtaining the weight W and the transmission signal band of the feeder link, the smaller the amount of interference cancellation. For example, in the plural GW systems in FIG. 2A and FIG. 2B described above, three GW stations 70(1) to 70(3) are installed at every 120°, and three FL antennas 211(1) to 211(3) of the relay communication station 21 of the HAPS 20 are installed at every 120° on the circumference of the radius Δd. Since the airframe of the HAPS 20 generally flies while rotating in the stratosphere, for example, as shown in FIG. 5 described above, the FL antennas 211(1) to 211(3) of the relay communication station 21 control the beam so that the main beam faces the opposing GW stations 70(1) to 70(3). Herein, rotation angle cp of the airframe of the HAPS 20 is a relative rotation angle with each GW station direction as 0°. With the rotation of the airframe of the HAPS 20, the propagation path (phase mainly due to the difference in path length) of each FL antennas 211(1) to 211(3) on the circumference of the radius Δd changes. Since the weight W is determined by the frequency of the pilot signal (hereinafter referred to as "pilot frequency"), the amount of interference cancellation in a signal band different from the pilot frequency decreases, the larger the frequency difference and the smaller the amount of cancellation.

Figure 13:
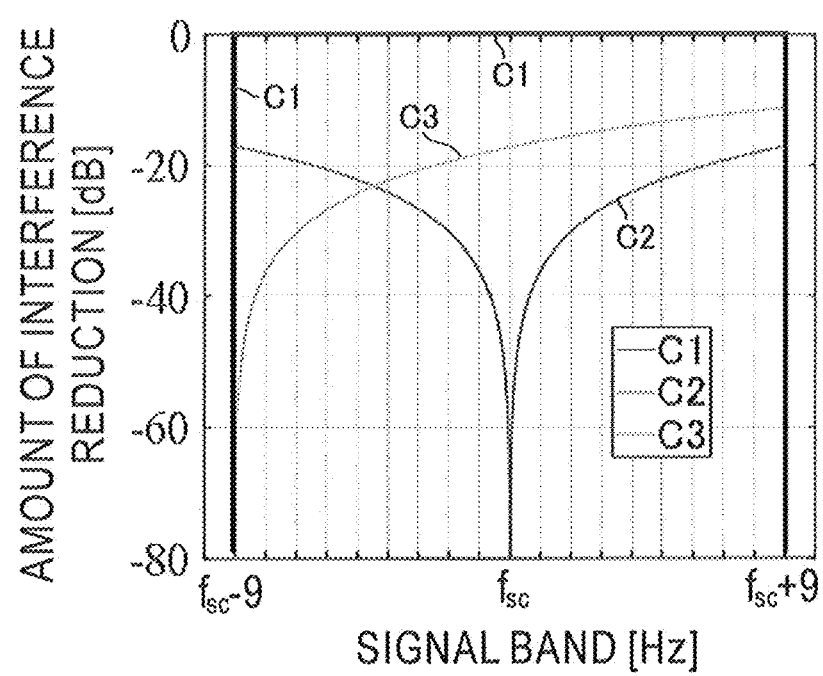
FIG. 13 is a graph showing an example of a computer simulation result that evaluates an interference reduction effect when the weights are obtained at pilot frequencies different from each other according to the reference example.
Figure 14:
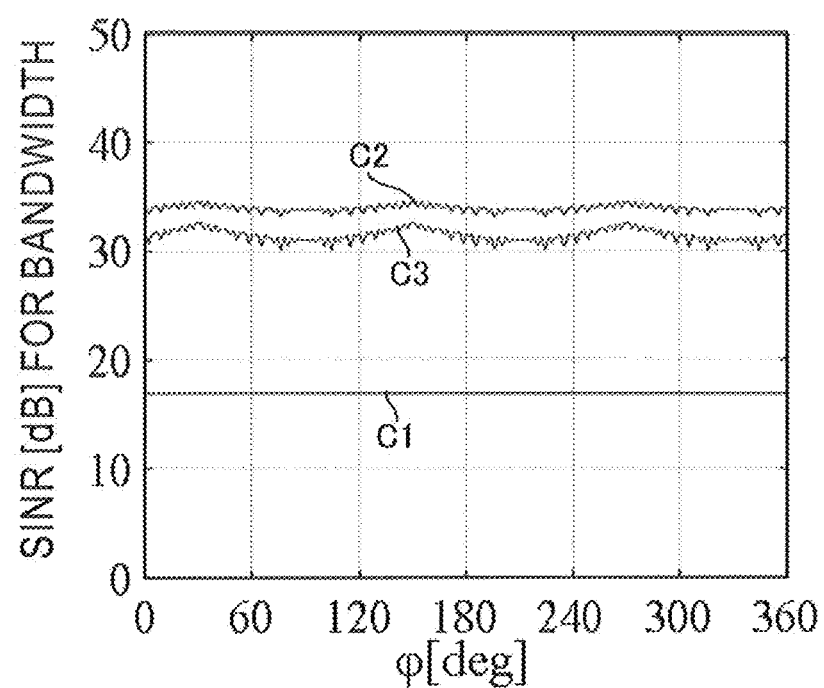
FIG. 14 is a graph showing an example of a computer simulation result of SINR characteristics of an entire transmission signal band of a feeder link when an airframe of HAPS is rotated.

FIG. 13 is a graph showing an example of computer simulation results for evaluating interference reduction effect when the weights W are obtained at pilot frequencies different from each other. Further, FIG. 14 is a graph showing an example of computer simulation results of a SINR characteristic of an entire transmission signal band of the feeder link when the airframe of the HAPS 20 is rotated. The evaluation parameters are shown in Table 1.

TABLE 1

| Evaluation Parameter | Value |
| --- | --- |
| Number of ground stations (GW stations) | 3 |
| Disposed radius R of ground stations (GW stations) | 100 km |
| Number of antennas of HAPS relay communication station | 3 |
| Disposed radius r of antennas of HAPS relay communication station | 0.5 m |
| Carrier frequency | 3.3 GHz |
| Bandwidth B of transmission signals | 18 MHz |
| Gain of antenna | 20 dBi |
| Front-back ratio (F/B ratio) of antenna | 20 dB |
| S/N ratio | 20 dB |

A radius Δd of the FL antenna (relay antenna) 211 is 0.5 [m], a gain of the FL antenna 211 is 20 [dBi], and a front-back ratio (F/B ratio) is 20 [dB]. Assuming that a reception SNR of the relay communication station 21 received by an omnidirectional antenna is 20 [dB], a reception SNR of the relay communication station 21 received by the FL antenna 211 is 40 [dB]. Further, the transmission signal bandwidth of the feeder link is set to 18 [MHz]. As an example, evaluate in case that the pilot frequency is set at the edge and the center of the transmission signal bandwidth of the feeder link As shown in FIG. 13, it is found that the amount of interference reduction in the transmission signal band of the feeder link differs depending on the pilot frequency. In case that the pilot frequency is set to the center of the transmission signal band (C2 in the figure), interference can be reduced over the entire transmission signal bandwidth. Further, in case that the pilot frequency is set to the center of the transmission signal band (C2 in the figure) as shown in FIG. 14, it is found that the SINR can be improved by 15 dB or more as compared with the case without the interference canceller.

Figure 15:
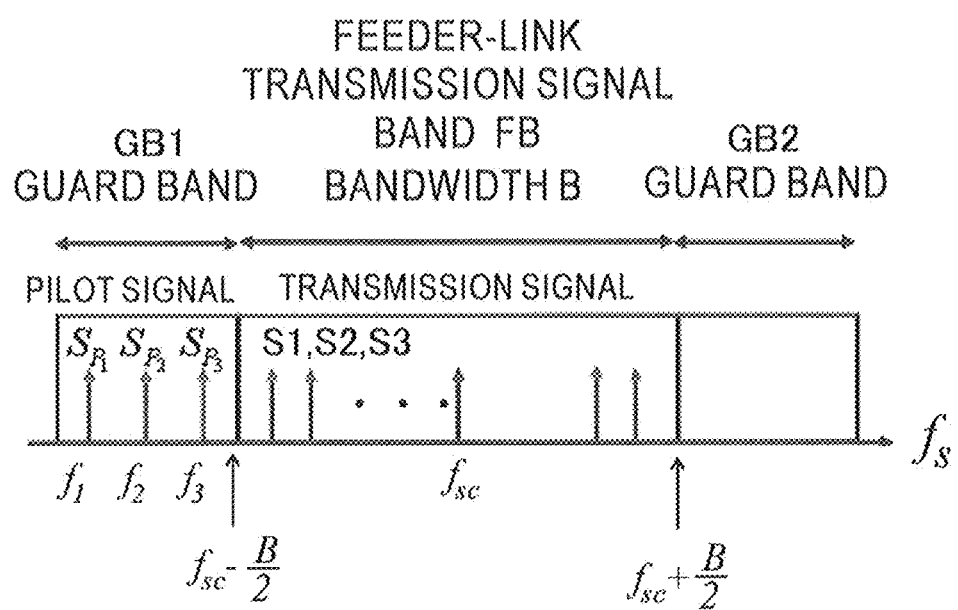
FIG. 15 is an illustration showing a reference example of frequencies of respective pilot signals in case that each of plural GW stations transmits a single pilot signal.
Figure 16:
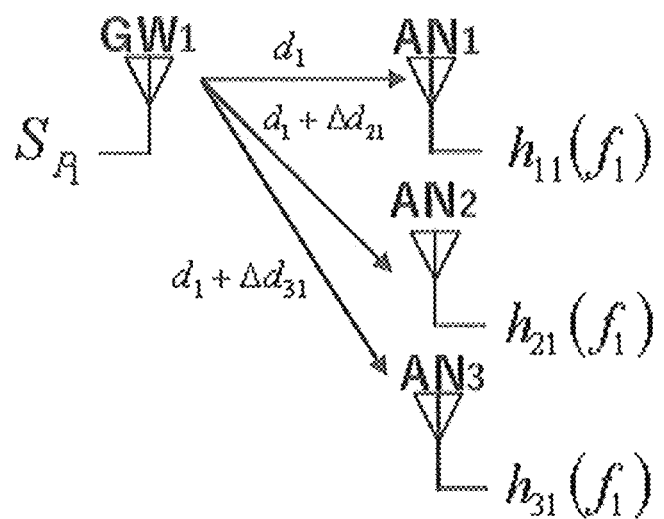
FIG. 16 is an illustration showing an example of a derivation model of a propagation path response of a feeder link using the pilot signal in FIG. 15.

FIG. 15 is an illustration showing an example of frequencies $f_1$, $f_2$, and $f_3$ of respective pilot signals in case that each of the GW stations 70(1) to 70(3) transmits a single pilot signal. FIG. 16 is an illustration showing an example of a derivation model of a propagation path response of feeder links using the pilot signal in FIG. 15. In the illustrated example, pilot signals $S_{P1}$, $S_{P2}$, and $S_{P3}$ are transmitted one by one from respective GW station 70(1) to 70(3). The pilot signals $S_{P1}$, $S_{P2}$, and $S_{P3}$ are disposed in a first guard band GB1 which is a first adjacent band adjacent to the transmission signal band FB of the feeder link to which the desired signals S1, S2, and S3 are transmitted from the low frequency side.

For example, each of pilot signals $h_{11}$ and $h_{21}$ received by the FL antennas 211(1) and 211(2) of the HAPS 20 is represented by the following equations (4) and (5), and the ratio of these signals is represented by the following equation (6).

$$h_{11} = |h_{11}|e^{j\theta_{11}} = |h_{11}|e^{j2\pi f_i \frac{d_1}{c}} \quad (4)$$

$$h_{21} = |h_{21}|e^{j\theta_{21}} = |h_{21}|e^{j2\pi f_i \frac{d_1+\Delta d_{21}}{c}} \quad (5)$$

$$\frac{h_{21}}{h_{11}} = \frac{|h_{21}|}{|h_{11}|}e^{j(\theta_{21}-\theta_{11})} = \frac{|h_{21}|}{|h_{11}|}e^{j2\pi f_{1c} \frac{\Delta d_{21}}{c}} \quad (6)$$

In the foregoing equations (4) to (6), $d_1$ is the path length between the GW station 70(1) and the FL antenna 211(1), $\Delta d_{21}$ is the difference in path length (path difference) between the GW station 70(1) and each of the FL antennas 211(1) and 211(2), and $\Delta d_{31}$ is the difference in path length (path difference) between the GW station 70(1) and each of the FL antennas 211(1) and 211(3). The path length between the GW station 70(1) and the FL antenna 211(2) is represented by $d_1+\Delta d_{21}$, and the path length between the GW station 70(1) and the FL antenna 211(3) is represented by $d_1+\Delta d_{31}$.

From the foregoing equation (6), the path difference $\Delta d_{21}$ can be obtained by the following equation (7). θ in the equation is the phase difference between $h_{21}$ and $h_{11}$. Other path differences such as the route difference $\Delta d_{31}$ mentioned above can be obtained in the same manner.

$$e^{j2\pi f_{1c} \frac{\Delta d_{21}}{c}} = e^{j(\theta_{21}-\theta_{11})} \quad (7)$$

$$\Delta d_{21} = \frac{c}{2\pi f_1}\theta$$

$$= \frac{\lambda_1}{2\pi}\theta$$

$$(\theta = \theta_{21} - \theta_{11})$$

The same can be obtained for the above-mentioned path difference $\Delta d_{31}$ and other path differences $\Delta d_{12}$, $\Delta d_{13}$, $\Delta d_{23}$, and $\Delta d_{32}$.

Using the path differences $\Delta d_{21}$, $\Delta d_{31}$, $\Delta d_{12}$, $\Delta d_{13}$, $\Delta d_{23}$, and $\Delta d_{32}$ mentioned above, the propagation path response at the center frequency fsc of the transmission signal band of the feeder link can be estimated by the following equation (8).

$$H_p = \begin{bmatrix} |h_{11}| & |h_{12}|e^{j2\pi f_2 \frac{\Delta d_{12}}{c}} & |h_{13}|e^{j2\pi f_3 \frac{\Delta d_{13}}{c}} \\ |h_{21}|e^{j2\pi f_1 \frac{\Delta d_{21}}{c}} & |h_{22}| & |h_{23}|e^{j2\pi f_3 \frac{\Delta d_{23}}{c}} \\ |h_{31}|e^{j2\pi f_1 \frac{\Delta d_{31}}{c}} & |h_{32}|e^{j2\pi f_2 \frac{\Delta d_{32}}{c}} & |h_{33}| \end{bmatrix} \quad (8)$$

However, in case that each of the GW stations 70(1) to 70(3) transmits one pilot signal $S_{P1}$, $S_{P2}$, $S_{P3}$ in the first guard band GB1 as shown in FIG. 15 and FIG. 16, it is not possible to detect a path difference equal to or more than the wavelengths $\lambda_1$, $\lambda_2$, $\lambda_3$ of each pilot signal. For example, assuming that the frequency $f_1$ of the pilot signal $S_{P1}$ of the GW station 70(1) is 3.3 GHz, $\Delta d_{21}$ can be estimated only in the range of $0 < \Delta d_{21} < 0.09$ [m].

Therefore, in the present embodiment, plural pilot frequencies with frequencies different from each other are transmitted from each of the GW stations 70(1) to 70(3) so that the path difference equal to or more than the wavelengths $\lambda_1$, $\lambda_2$, $\lambda_3$ of each pilot signal $S_{P1}$, $S_{P2}$, $S_{P3}$ can be detected. In the example of the following embodiments, although it is illustrated regarding a case in which each of the GW stations 70(1) to 70(3) transmits two (plural) pilot signals with frequencies different from each other, the number of pilot signals transmitted by each of the GW stations 70(1) to 70(3) may be 3 or more. Further, the number of pilot signals may be different from each other between the GW stations 70(1) to 70(3).

Figure 17:
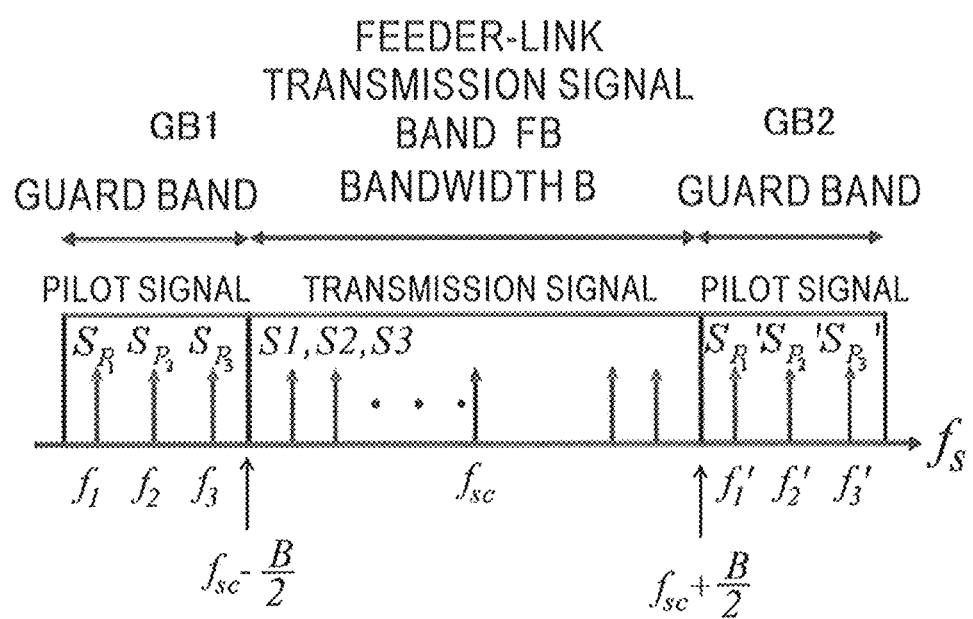
FIG. 17 is an illustration showing a reference example of a frequency arrangement of respective pilot signals in case that each of plural GW stations transmits plural pilot signals.
Figure 18:
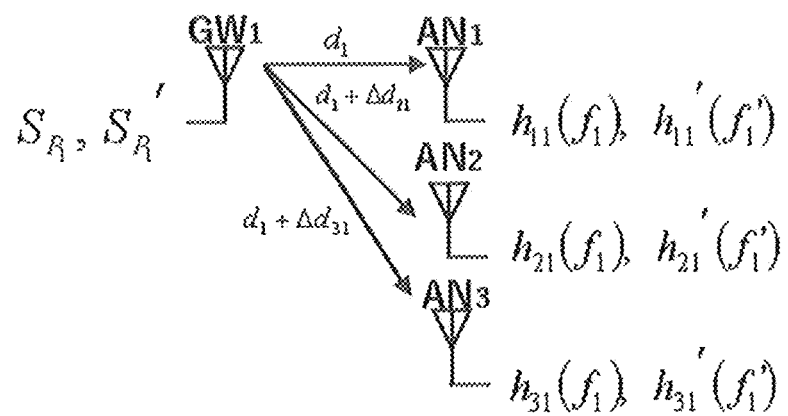
FIG. 18 is an illustration showing an example of a derivation model of a propagation path response of a feeder link using the pilot signals in FIG. 17.

FIG. 17 is an illustration showing an example of frequency arrangement of respective pilot signals when the plural GW stations 70(1) to 70(3) respectively transmit plural pilot signals. FIG. 18 is an illustration showing an example of a derivation model of the propagation path response of the feeder link using the pilot signals in FIG. 17. In the illustrated example, plural pilot signals transmitted from each of the GW station 70(1) to 70(3) are distributed and disposed in each of a first guard band GB1, which is a first adjacent band adjacent to the transmission signal band FB of the feeder link to which the desired signals S1, S2, S3 are transmitted from the GW stations 70(1) to 70(3) from the low frequency side and the high frequency side, and a second guard band GB2, which is a second adjacent band. Specifically, pilot signals $S_{P1}$, $S_{P2}$, $S_{P3}$, which are transmitted from respective GW station 70(1) to 70(3) with frequencies $f_1$, $f_2$, $f_3$ different from each other, are disposed in the first guard band GB1. Further, pilot signals $S_{P1}'$, $S_{P2}'$, $S_{P3}'$, which are transmitted from respective GW station 70(1) to 70(3) with frequencies $f_1'$, $f_3'$ different from each other, are disposed in the second guard band GB2. The relay communication station 21 of the HAPS 20 separates each of the plural pilot signals $S_{P1}$, $S_{P2}$, $S_{P3}$ of the first guard band GB1 received from the GW stations 70(1), 70(2) and 70(3) by a filter, and separates each of the plural pilot signals $S_{P1}'$, $S_{P2}'$, $S_{P3}'$ of the second guard band GB2 received from the GW stations 70(1), 70(2) and 70(3) by a filter.

For example, each of the pilot signals $h_{11}$, $h_{11}'$, $h_{21}$ and $h_{21}'$ received by the FL antennas 211(1) and 211(2) of the HAPS 20 is represented by the following equations (9), (10), (11) and (12), and each of the ratios of these signals is represented by the following equations (13) and (14).

$$h_{11} = |h_{11}|e^{j\theta_{11}} = |h_1|e^{j2\pi f_1 \frac{d_1}{c}} \quad (9)$$

$$h_{11}' = |h_{11}|e^{j\theta_{11}'} = |h_{11}|e^{j2\pi f_1' \frac{d_1}{c}} \quad (10)$$

$$h_{21} = |h_{21}|e^{j\theta_{21}} = |h_{21}|e^{j2\pi f_1 \frac{d_1+\Delta d_{21}}{c}} \quad (11)$$

$$h_{21}' = |h_{21}|e^{j\theta_{21}'} = |h_{21}|e^{j2\pi f_1' \frac{d_1+\Delta d_{21}}{c}} \quad (12)$$

$$\frac{h_{21}}{h_{11}} = \frac{|h_{21}|}{|h_{11}|}e^{j(\theta_{21}-\theta_{11})} = \frac{|h_{21}|}{|h_{11}|}e^{j2\pi f_1 \frac{\Delta d_{21}}{c}} \quad (13)$$

$$\frac{h_{21}'}{h_{11}'} = \frac{|h_{21}|}{|h_{11}|}e^{j(\theta_{21}'-\theta_{11}')} = \frac{|h_{21}|}{|h_{11}|}e^{j2\pi f_1' \frac{\Delta d_{21}}{c}} \quad (14)$$

In the equations (9) to (14), $d_1$ is the path length between the GW station 70(1) and the FL antenna 211(1), and $\Delta d_{21}$ is the difference in path length (path difference) between the GW station 70(1) and each of the FL antennas 211(1) and 211(2). The path length between the GW station 70(1) and the FL antenna 211(2) is represented by $d_1+\Delta d_{21}$.

From the equations (13) and (14), the path difference $\Delta d_{21}$ can be obtained by the following equation (15). Note that $\theta$ in the equation (15) is a phase difference obtained by adding the phase difference between $h_{11}'$ and $h_{11}$ and the phase difference between $h_{21}$ and $h_{21}'$. That is, $\theta$=(phase difference between $h_{11}'$ and $h_{11}$)+(phase difference between $h_{21}$ and $h_{21}'$).

$$e^{j2\pi(f_1-f_1')\frac{\Delta d_{21}}{c}} = e^{j(\theta_{21}-\theta_{11}-\theta_{21}'+\theta_{11}')} \quad (15)$$

$$\Delta d_{21} = \frac{c}{2\pi(f_1-f_1')}\theta$$

$$= \frac{c}{2\pi B}\theta$$

$$(\theta = \theta_{21} - \theta_{21}' + \theta_{11}' - \theta_{11})$$

Path difference $\Delta d_{31}$ and other path differences $\Delta d_{12}$, $\Delta d_{13}$, $\Delta d_{23}$, $\Delta d_{32}$ between the GW station 70(1) and each of the FL antennas 211(1) and 211(3) can be similarly obtained.

Using the path differences $\Delta d_{21}$, $\Delta d_{31}$, $\Delta d_{12}$, $\Delta d_{13}$, $\Delta d_{23}$, and $\Delta d_{32}$ mentioned above, the propagation path response at the center frequency fsc of the transmission signal band of the feeder link can be estimated as in the foregoing equation (8).

In case that each of the GW stations 70(1) to 70(3) transmits the plural pilot signals as shown in FIG. 17 and FIG. 18, it is possible to detect a path difference equal to or more than the wavelengths $\lambda_1$, $\lambda_2$, $\lambda_3$ of each pilot signal. For example, assuming the LTE, the bandwidth B of the transmission signal band FB of the feeder link is 18 MHz, so that $\Delta d_{21}$ can be estimated in the range within the wavelength of the pilot frequency difference B as shown in the equation (15). In the present example, it can be estimated accurately up to the range of $0 < \Delta d_{21} < 16$ [m], which is a range required for implementing.

Further, in the examples in FIG. 17 and FIG. 18, since the plural pilot signals $S_{P1}$, $S_{P2}$, $S_{P3}$ and pilot signals $S_{P1}'$, $S_{P2}'$, $S_{P3}'$, which are transmitted from respective GW station 70(1) to 70(3) with frequencies $f_1$, $f_2$, $f_3$, $f_2'$, $f_3'$ different from each other, are evenly distributed and disposed in the first guard band GB1 and the second guard band GB2, each pilot signal can be separated by the filter and easily individually detected.

Figure 19:
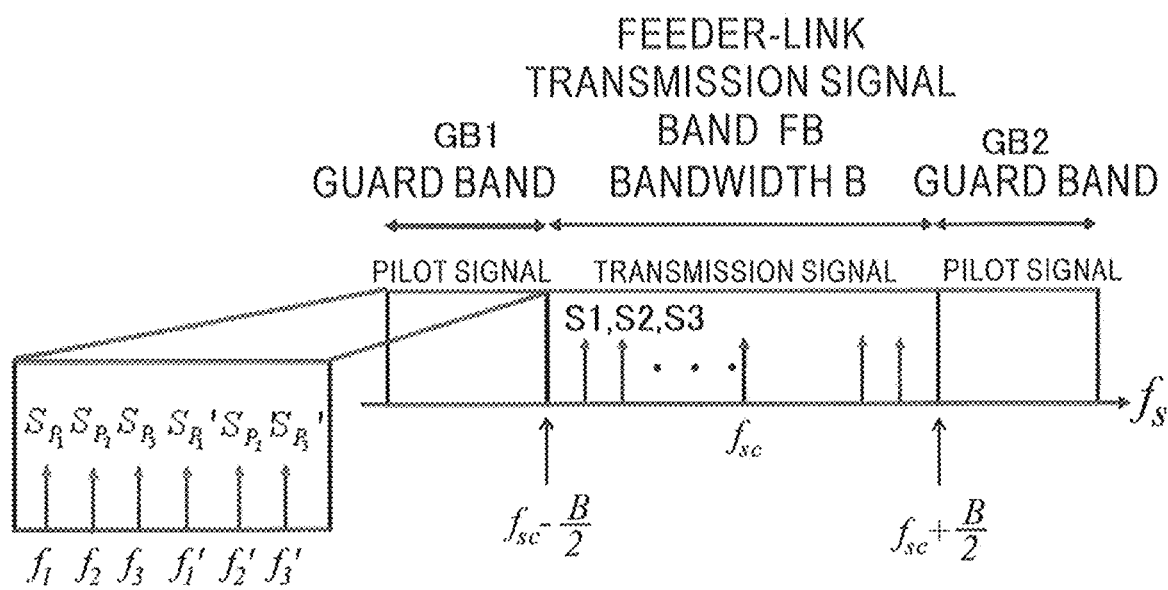
FIG. 19 is an illustration showing another reference example of an arrangement of pilot frequencies in case that each of plural GW stations transmits plural pilot signals.

FIG. 19 is an illustration showing another example of arrangement of pilot signals when the plural GW stations 70(1) to 70(3) respectively transmit plural pilot signals. In the illustrated example, it is an example in which the plural pilot signals $S_{P1}$, $S_{P2}$, $S_{P3}$ and pilot signals $S_{P1}'$, $S_{P2}'$, $S_{P3}'$ transmitted from the GW stations 70(1) to 70(3) with frequencies $f_1$, $f_2$, $f_3$, $f_2'$, $f_3'$ different from each other are all disposed in the first guard band GB1. The relay communication station 21 of the HAPS 20 filters each of the plural pilot signals $S_{P1}$, $S_{P2}$, $S_{P3}$, $S_{P1}'$, $S_{P2}'$, and $S_{P3}'$ of the first guard band GB1 received from the GW stations 70(1) to 70(3) by the filter.

Figure 20:
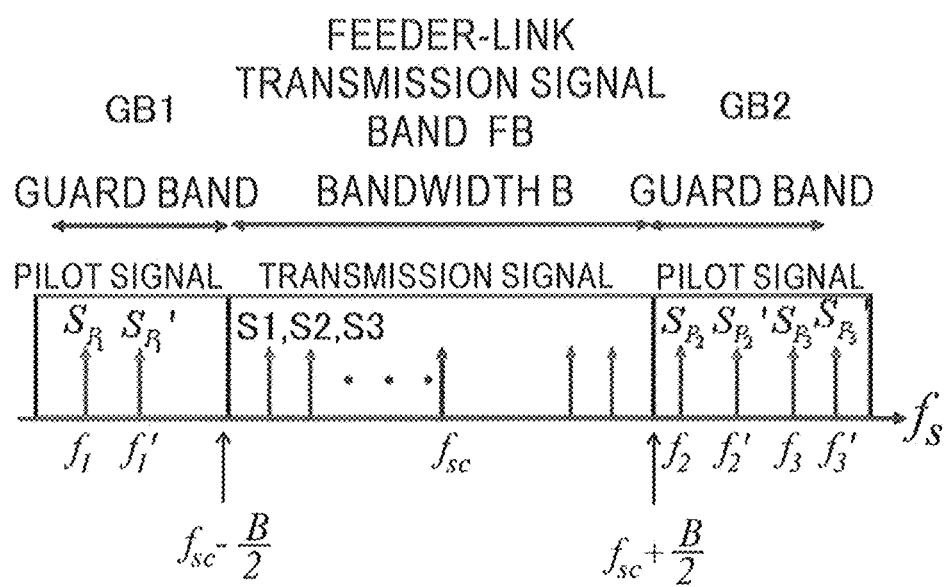
FIG. 20 is an illustration showing yet another reference example of an arrangement of pilot frequencies in case that each of plural GW stations transmits plural pilot signals.

FIG. 20 is an illustration showing yet another example of arrangement of pilot signals when the plural GW stations 70(1) to 70(3) respectively transmit plural pilot signals. The illustrated example is an example in which the numbers of pilot signals disposed in the first guard band GB1 and the second guard band GB2 are different from each other. Specifically, pilot signals $S_{P1}$ and $S_{P1}'$, which are transmitted from the GW station 70(1) with frequencies $f_1$ and different from each other, are disposed in the first guard band GB1, and pilot signals $S_{P2}$, $S_{P2}'$, $S_{P3}$, $S_{P3}'$, which transmitted from GW stations 70(2) and 70(3) with frequencies $f_2$, $f_2'$, $f_3$, $f_3'$ different from each other, are disposed in the second guard band GB2. The relay communication station 21 of the HAPS 20 separates each of the plural pilot signals $S_{P1}$ and $S_{P1}'$ of the first guard band GB1 received from the GW station 70(1) by the filter, and separates each of the plural pilot signals $S_{P2}$, $S_{P2}'$, $S_{P3}$, $S_{P3}'$ of the second guard band GB2 received from the GW stations 70(2) and 70(3) by the filter.

In particular, in an arrangement example of the pilot signal in FIG. 20, the pilot signals $S_{P1}$ and $S_{P1}'$ transmitted from respective GW station 70(i) (i=1, 2, 3) are disposed in the same guard band. Specifically, the pilot signals $S_{P1}$, $S_{P1}'$ transmitted from the GW station 70(1) are disposed in the first guard band GB1, and the pilot signals $S_{P2}$, $S_{P2}'$, $S_{P2}$, $S_{P3}$, $S_{P3}'$ transmitted from the GW stations 70(2) and 70(3) are disposed in the second guard band GB2. When the pilot signals $S_{P1}$, $S_{P1}'$ transmitted from the same GW station 70(i) at frequencies $f_1$ and are disposed in the same guard band in this way, the frequency difference of becomes small, so that the estimated distance of $\Delta d_{21}$ becomes large as shown in the foregoing equation (15).

It is noted that, the weight used for the interference canceller using the matrix Hfc of the propagation path response can be calculated by, for example, the ZF (Zero-Forcing) method or the MMSE (Minimum Mean Square Error) method using the matrix of the propagation path response.

For example, in the ZF method, the weight W can be obtained by the inverse matrix of the matrix $H_{fc}$ of the propagation path response as in the following equation (16).

$$W = H_P^{-1}(f_{sc}) \tag{16}$$

Further, in the MMSE method, the weight W can be used by the following equation (17). Herein, NT is the number of transmission antennas and γ is the SNR.

$$W = \left( H_P^H(f_{SC}) H_P(f_{SC}) + \frac{N_T I_{N_T}}{\gamma} \right)^{-1} H_P^H(f_{SC}) \tag{17}$$

In the examples of FIG. 12 to FIG. 20 shown above, the propagation path response Hs(fi) at one estimation frequency fi in the transmission signal band FB is estimated from the pilot signals received from the GW stations, and the weight Wp is derived based on the propagation path response Hs(fi) at the estimation frequency fi. Ss' (signal to be subtracted from the reception signal from the target GW station) obtained by multiplying the wait Wp by the reception signal Es from another GW station is calculated by, for example, the following equation (18). In the equation, Ss is a transmission signal transmitted from another GW station, N is noise, and Hs(fs) is a propagation path response at the transmission frequency fs of the transmission signal Ss in the transmission signal band FB.

$$S_s(t)' = W_p E_s(t) = H_P^{-1}(f_{SC})(H_s(f_s) S_s(t) + N(t)) = (H_P^{-1}(f_{SC}) H_s(f_s) S_s(t) + H_P^{-1}(f_{SC}) N(t) \tag{18}$$

Figure 21:
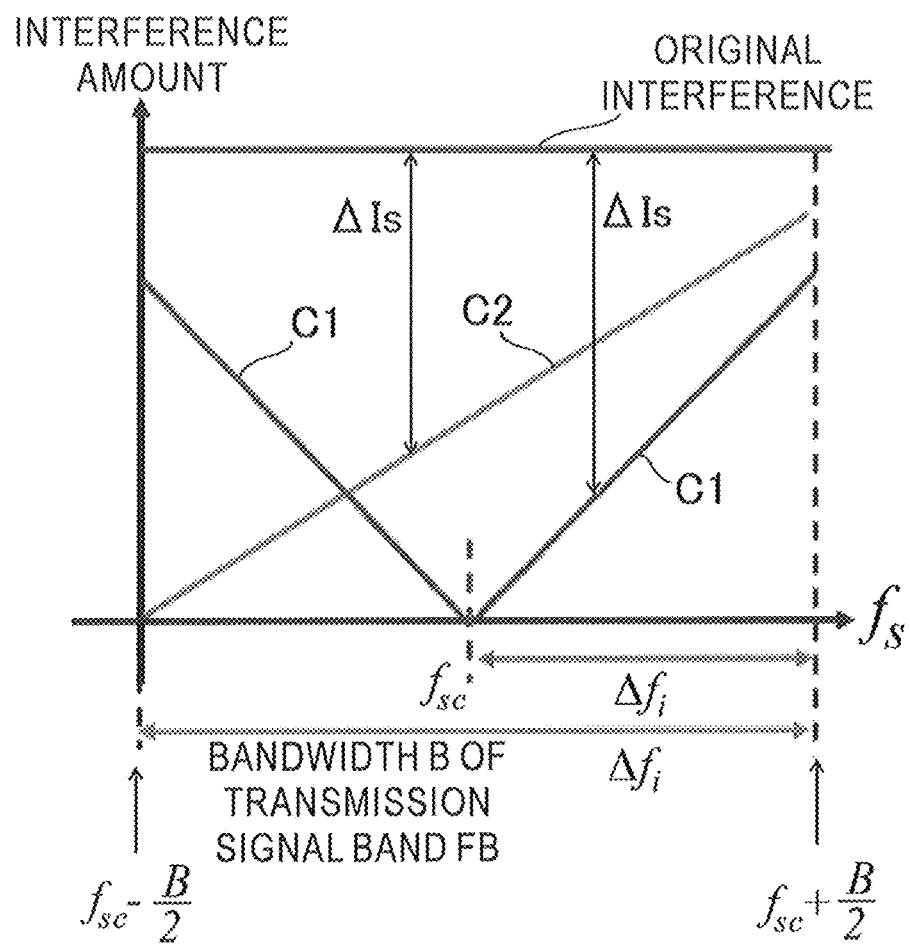
FIG. 21 is a graph showing an example of an interference reduction effect when the weight is obtained based on a propagation path response estimated by setting each of a center frequency and a frequency at a low-frequency side end of the feeder-link transmitting signal band FB as an estimation frequency.

In the equation (18), in case that the estimation frequency fi and the transmission frequency fs are equal to each other (fi=fs), $(Hs(f_1)^{-1} Hs(fs))$ Ss becomes the identity matrix I, so that the interference suppression amount (interference cancellation amount) becomes maximum, and the larger the difference (Δfi) between the estimation frequency fi and the transmission frequency fs, the smaller the interference suppression amount (interference cancellation amount). For example, in case that the estimation frequency fi, at which the propagation path response $Hs(f_1)$ is estimated, is located at the center frequency fsc of the transmission signal band FB of the feeder link as shown in C1 of FIG. 21, the interference suppression amount (interference cancellation amount) ΔIs becomes maximum when the transmission frequency fs is the center frequency fsc, and the closer the transmission frequency fs approaches the end portion of the transmission signal band FB, the larger the Δfi becomes, and the more the amount of interference suppression (interference cancellation amount) decreases, and Δfi becomes maximum and ΔIs becomes minimum at the end. In case that the estimation frequency fi, at which the propagation path response $Hs(f_1)$ is estimated, is located at the low-frequency side end (fsc-B/2) of the transmission signal band FB of the feeder link as shown in C2 of FIG. 21, Δfi becomes maximum, the interference suppression amount (interference cancellation amount) becomes maximum when the transmission frequency fs is at the low-frequency side end (fsc-B/2), and the closer as the transmission frequency fs approaches the high frequency side end (fsc+B/2) of the transmission signal band FB, the more Δfi increases and the more the interference suppression amount (interference cancellation amount) ΔIs decreases, and Δfi becomes maximum and ΔIs becomes minimum at the side end. In case that the transmission frequency fs is the center frequency fsc, the maximum value of Δfi is the minimum and the minimum value of ΔIs is the maximum, so that the interference reduction effect is most highly enhanced.

Figure 22:
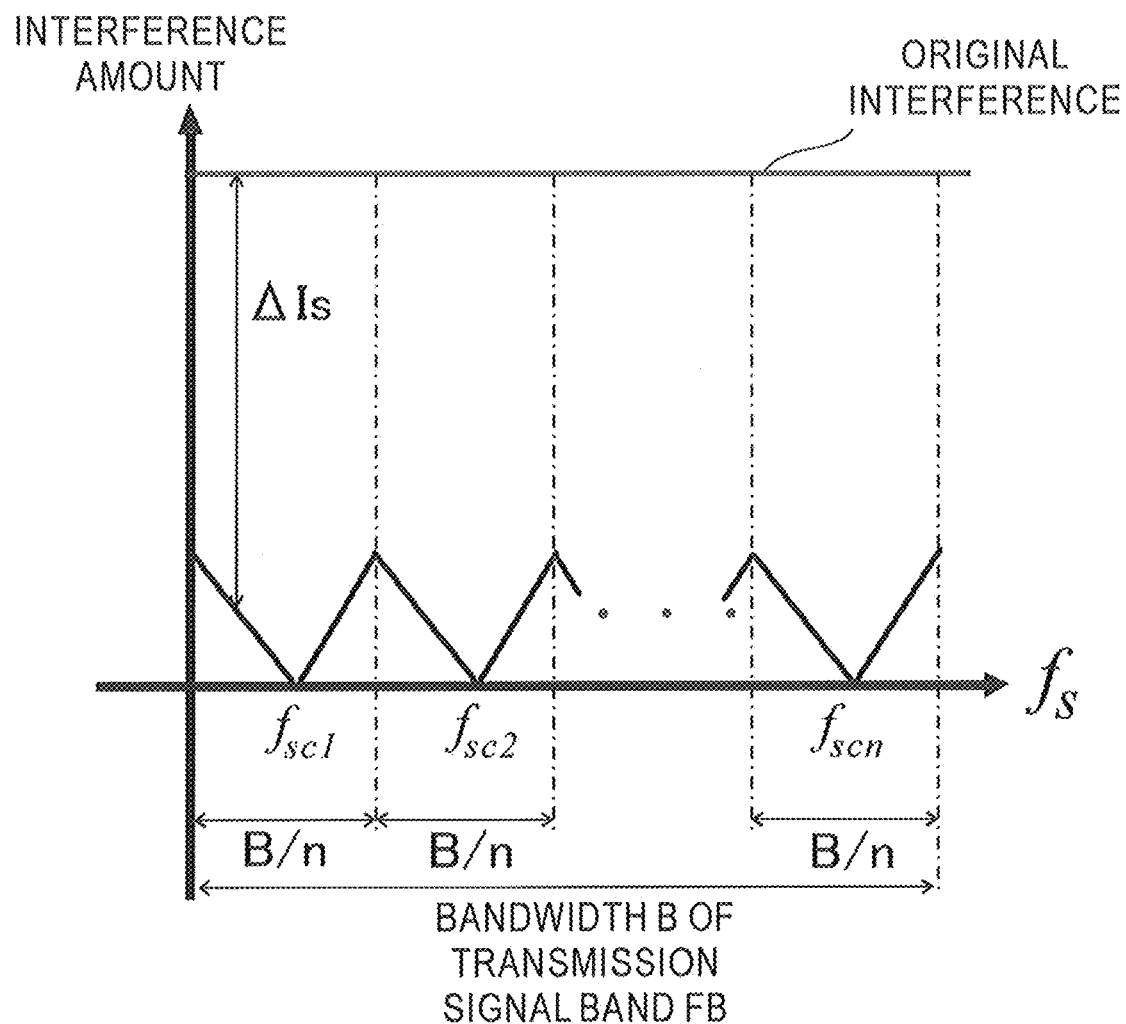
FIG. 22 is an illustration showing an example of a frequency division and an interference quantity reduction of the transmission signal band FB of the feeder link in the feeder-link interference suppression process according to the present embodiment.

Therefore, in the present embodiment, in order to increase the interference suppression amount (interference cancellation amount) over the entire transmission signal band FB, the transmission signal band FB with the entire bandwidth B is divided into plural (n) frequency bands (hereinafter, referred to as "divided frequency bands") FB1 to FBn with bandwidth B/n, and an interference suppression process between feeder links including the estimation of the propagation path response H and the calculation of the weight W is performed as shown in FIG. 22 and the following (1) to (3).

(1) Estimation of the Propagation Path Response for Each Divided Frequency Band:

Plural propagation path responses H(fsc1) to H(fscn) between each of the plural GW stations 70(1) to 70(3) and the antennas for feeder link 211(1) to 211(3) of the HAPS 20 are estimated for each of the plural divided frequency bands FB1 to FBn, by setting the center frequencies fsc1 to Fscn of each of the plural divided frequency bands FB1 to FBn as the estimation frequency fi, based on the reception results of the pilot signal received from each of the plural GW stations 70(1) to 70(3).

(2) Calculation of the Weight for Each Divided Frequency:

With respect to each of the plural GW stations 70(1) to 70(n), weights Wp1 to Wpn for suppressing each interference signal that causes interference by the transmission signal transmitted from each GW station and received with the directional beams corresponding to the other GW stations, are calculated for each divided frequency band (FB1 to FBn) divided into n based on the plural propagation path responses H(fsc1) to H(fscn).

(3) Interference-Canceling Signal Processing for Each Divided Frequency:

With respect to each of the plural GW stations 70(1) to 70(3), the reception signals received by the directional beams corresponding to the other GW stations are respectively multiplied by the weights Wp1 to Wpn corresponding to the other GW stations and subtracted from the reception signal received by the directional beam corresponding to each GW station, for each of the divided frequency bands FB1 to FBn divided into n.

Herein, assuming that the reception signals in the plural divided frequency bands FB1 to FBn are Es1 to Esn, Ss' (signal to be subtracted from the reception signal from the target GW station) is calculated by, for example, the following equation (19). Ss in the equation is a transmission signal transmitted from another GW station, and N is noise. The Hs(fsc1) to Hs(fscn) are propagation path responses, which are respectively estimated by setting the center frequencies fsc1 to fscn of the divided frequency bands FB1 to FBn as estimation frequencies. Further, the Hs (fs1) to Hs (fsn) are propagation path responses at the transmission frequencies fs1 to fsn of the transmission signal Ss in the divided frequency bands FB1 to FBn, respectively.

$$S_s(t) = \frac{1}{n}\sum_{k=1}^{n} W_P(f_{SCk})E_s(f_k) \qquad (19)$$

$$= \frac{1}{n}\sum_{k=1}^{n} H_P^{-1}(f_{SCk})H_s(f_k)S_s(t) + H_P^{-1}(f_{SCk})N(t)$$

$$f_{SC} - \frac{B}{2} + \frac{B}{n}(k-1) < f_k < f_{SC} - \frac{B}{2} + \frac{B}{n}k,$$

$$f_{SCk} = f_{SC} - \frac{B}{2} + \frac{B}{n}\left(k - \frac{1}{2}\right)$$

By dividing the transmission signal band FB of the feeder link into the plural divided frequency bands FB1 to FBn, and performing an interference suppression process between feeder links including the estimation of the propagation path response H and the calculation of the weight W, the difference (Δfi) between the estimation frequency fi that estimated the propagation path response H and the transmission frequency fs of the feeder link becomes smaller, and the interference suppression amount (interference cancellation amount) ΔIs can be increased over the entire transmission signal band FB as shown in FIG. 22.

Figure 23:
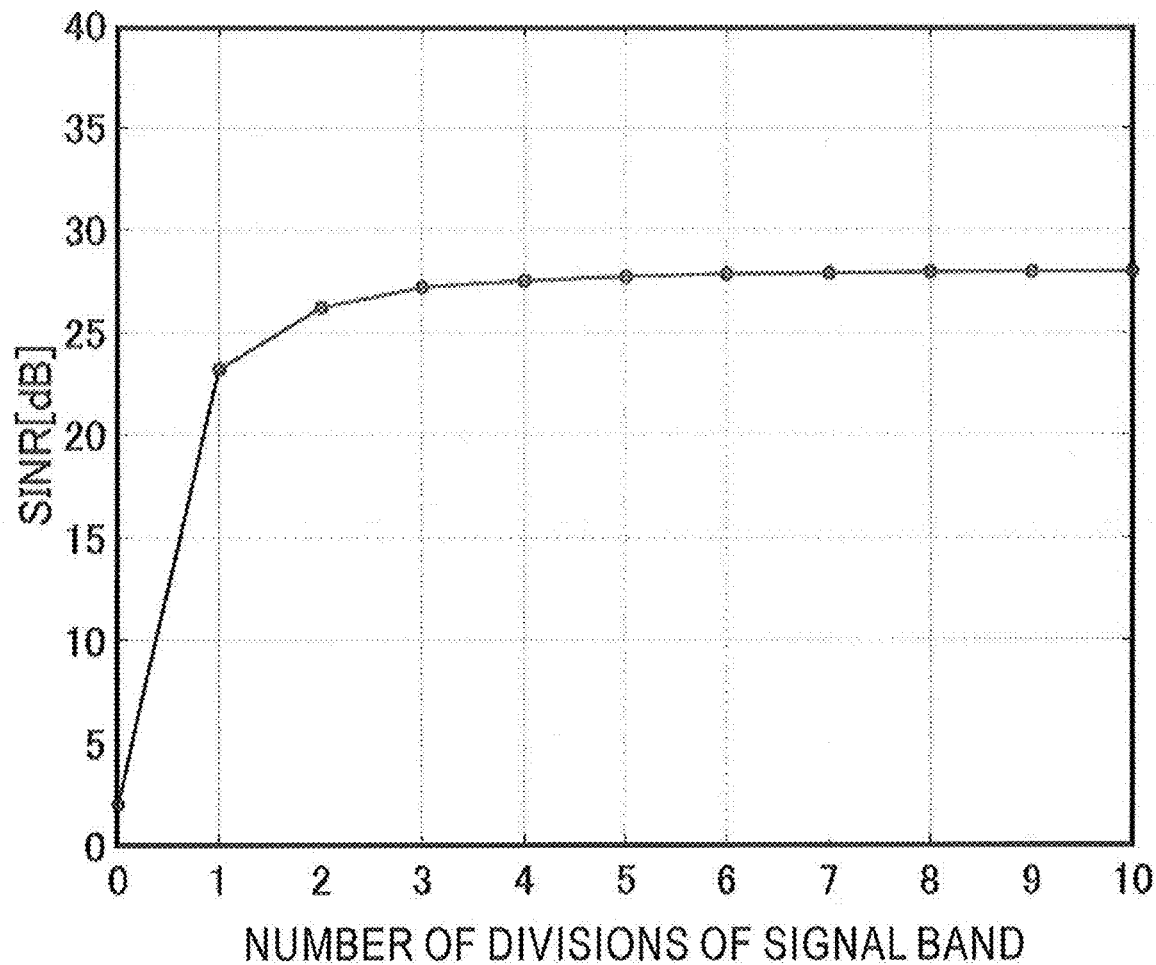
FIG. 23 is a graph showing an example of a relationship between the number of divisions of the transmission signal band FB and the SINR when receiving the feeder link of HAPS in the feeder-link interference suppression process according to the present embodiment.

FIG. 23 is a graph showing an example of a relationship between the number of divisions (n) of the transmission signal band FB and the SINR [dB] when receiving the feeder link of the HAPS 20 in the feeder-link interference suppression process according to the present embodiment. The vertical axis in the figure is an average value of SINR [dB] when the HAPS 20 makes one rotation (see FIG. 5 to FIG. 7). As shown in FIG. 23, when the number of divisions (n) of the transmission signal band FB of the feeder link increases, the interference suppression effect between the feeder links is enhanced, and the communication quality (SINR) of the feeder link is improved.

It is noted that, although the transmission signal band FB of the feeder link is evenly divided in the example of FIG. 22, the transmission signal band FB of the feeder link may be unequally divided. The unequal division of the transmission signal band FB may be performed according to the distribution of the interference signal of the feeder link in the transmission signal band FB of the feeder link. For example, as shown in FIG. 24, only the band FB1 including large number of or high-intensity interference signals of the feeder link among the transmission signal band FB may be divided to enhance the interference suppression effect, and the remaining band FB2 with small number of or low-intensity interference signals of the feeder link may not be divided.

Figure 24:
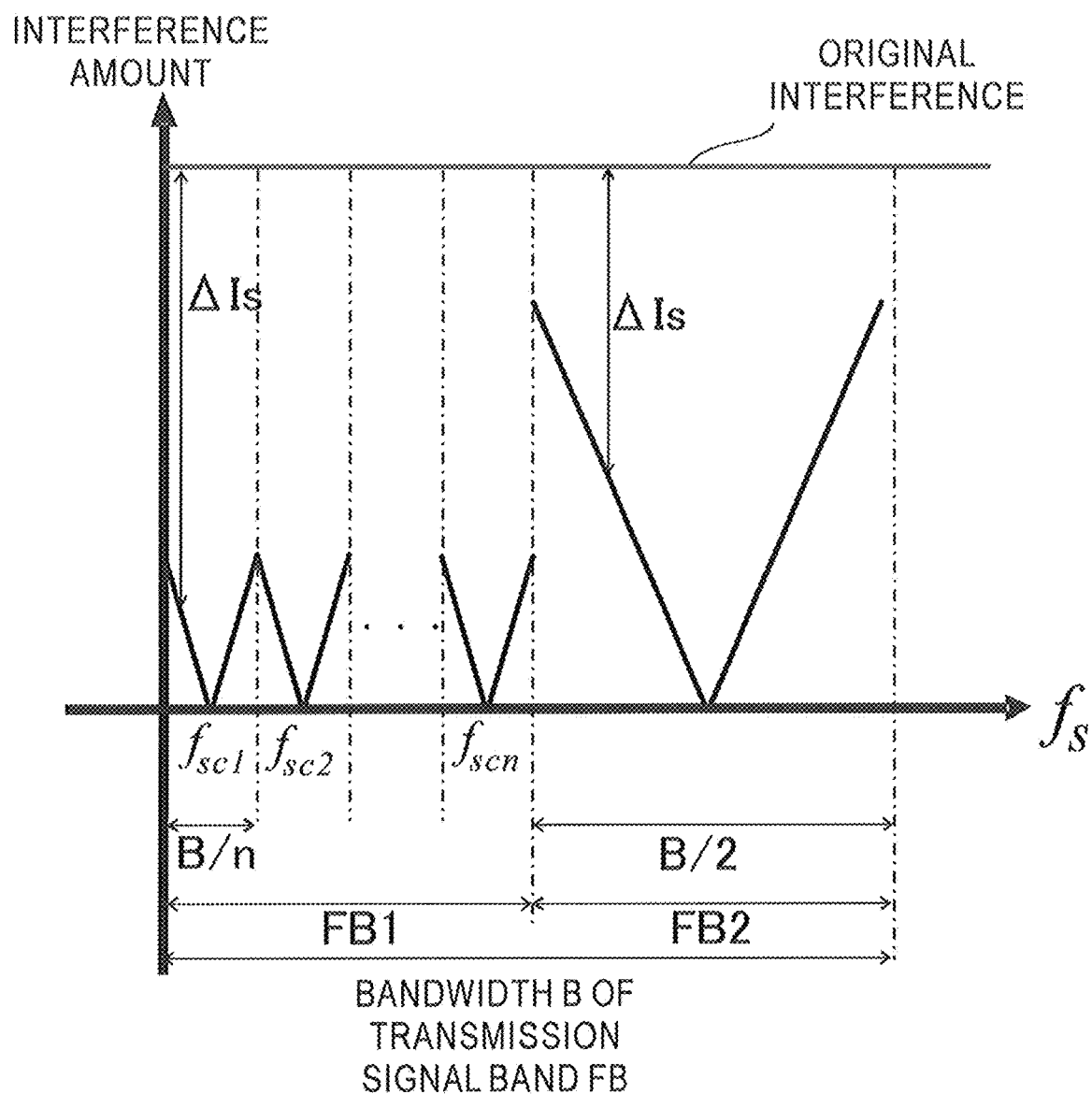
FIG. 24 is an illustration showing another example of a frequency division and an interference quantity reduction of the transmission signal band FB of the feeder link in the feeder-link interference suppression process according to the present embodiment.

As shown in the above examples of FIG. 22 to FIG. 24, the interference suppression effect can be enhanced by dividing the transmission signal band FB of the feeder link into plural parts, and performing the estimation of the propagation path responses, the calculation of the weight and the process of the interference cancel signals for each divided frequency band. However, the estimation of the propagation path response, the calculation of the weight and the process of the interference cancel signals need to be performed for plural divided frequency bands, which may increase the power consumption of the relay communication station 21.

Therefore, in the relay communication station 21 according to the following embodiments, it is configured so that the first interference suppression process performed without dividing the transmission signal band FB of the feeder link and the second interference suppression process performed by dividing the transmission signal band FB of the feeder link can be switched and executed.

The first interference suppression process is, as shown in the above-mentioned examples of FIG. 12 to FIG. 20, a process of suppressing an interference signal that causes interference by a transmission signal transmitted from the GW station 70 and received with a directional beam corresponding to another GW station 70, by using the propagation path response Hs(fi) in which one frequency (for example, center frequency fsc) in the transmission signal band FB is set as an estimation frequency fi based on the reception result of the pilot signal without dividing the transmission signal band FB of the feeder link. Although the first interference suppression process has a lower interference suppression effect than the second interference suppression process, the power consumption can be reduced to a low level.

On the other hand, the second interference suppression process is, as shown in the above-mentioned examples of FIG. 22 to FIG. 24, a process for suppressing the interference signal, by using the propagation path responses H(fsc1) to H(fscn) in which the transmission signal band FB of the feeder link is divided into plural divided frequency bands FB1 to FBn and one frequency (for example, the center frequencies fsc1 to fscn of each divided frequency band) in the divided frequency bands FB1 to FBn is set as the estimation frequency $f_1$ based on the reception result of the pilot signal for each divided frequency band. Although the second interference suppression process may increase power consumption, the interference suppression effect can be obtained.

Figure 25:
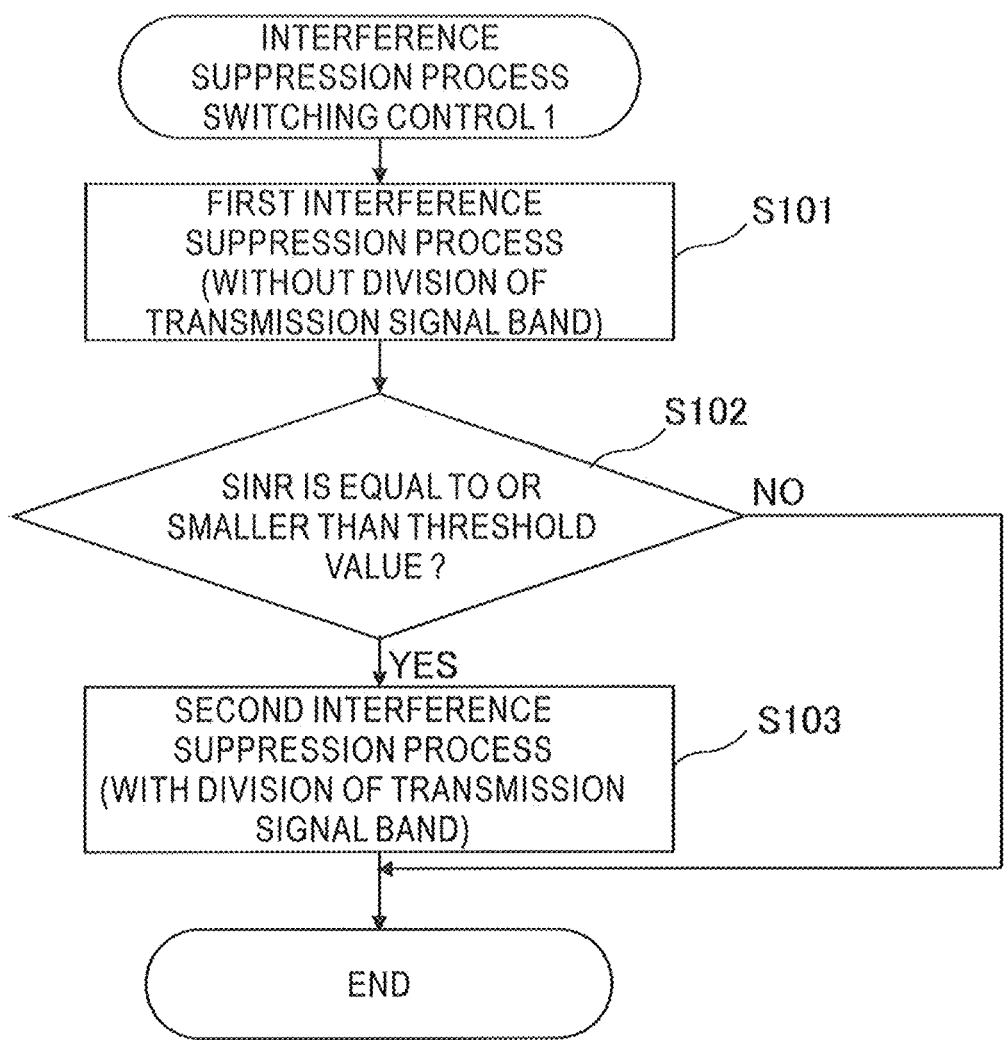
FIG. 25 is a flowchart showing an example of an interference-suppression process switching control according to the present embodiment.

FIG. 25 is a flowchart showing an example of an interference-suppression process switching control according to the present embodiment. In the example of FIG. 25, considering the features of the first interference suppression process and the second interference suppression process, the switching control of the interference suppression process is performed as follows. The relay communication station 21 according to the present embodiment normally executes the first interference suppression process in order to reduce power consumption (S101). Then, in case that the SINR corresponding to the communication quality of the feeder link deteriorates or in case that the deterioration of the SINR of the feeder link is predicted, it is controlled to switch from the first interference suppression process to the second interference suppression process. Specifically, when the SINR becomes equal to or less than a predetermined threshold value (YES in S102), it is controlled to switch from the first interference suppression process to the second interference suppression process (S103). By this switching control, the deterioration of the SINR can be prevented. Herein, the SINR (signal-to-interference noise ratio) is the ratio of the received signal power to the interference and noise power in consideration of the interference between the feeder links.

The deterioration of the SINR of the feeder link is caused by, for example, a deterioration of the FB ratio (front to rear ratio) of the gain of the directional beam 212 due to the beamforming of the antenna for feeder link (FL antenna) 211, a deterioration of the propagation path of the feeder link, an increase in the angle at which the main beam direction of the directional beam 212 of the FL antenna 211 deviates from the direction facing the target GW station 70, or the like.

Figure 26A:
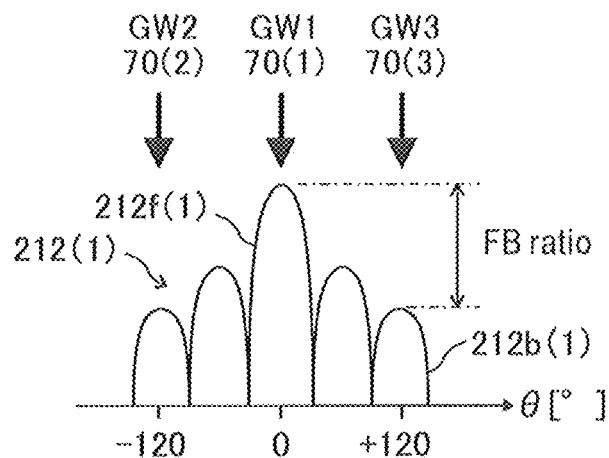
FIG. 26A is an illustration showing an example of deterioration of the FB ratio due to the beamforming of the FL antenna when the HAPS is rotated.
Figure 26B:
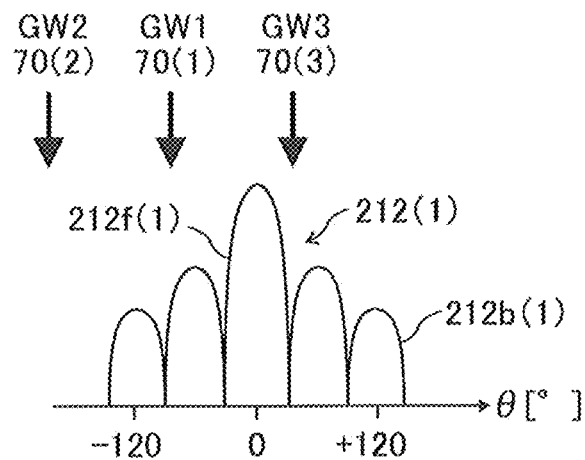
FIG. 26B is an illustration showing an example of deterioration of the FB ratio due to the beamforming of the FL antenna when the HAPS is rotated.
Figure 26C:
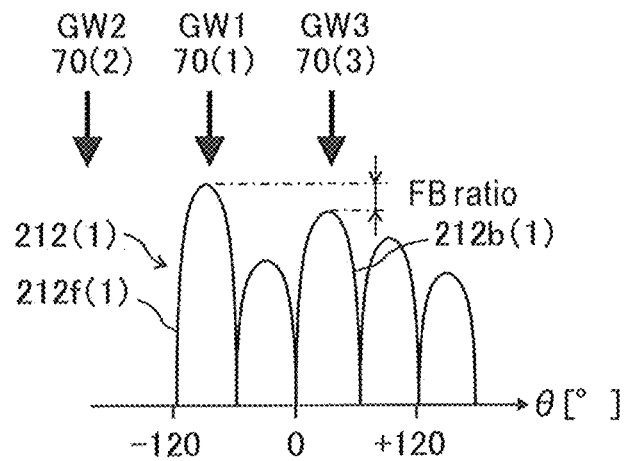
FIG. 26C is an illustration showing an example of deterioration of the FB ratio due to the beamforming of the FL antenna when the HAPS is rotated.

FIG. 26A to FIG. 26C are illustrations showing an example of deterioration of the FB ratio due to the beamforming of the FL antenna 211(1) when the HAPS 20 is rotated.

FIG. 26A shows a relationship between the directional beam 212 of the FL antenna 211(1) corresponding to the GW station 70(1) (GW1 in the figure) and the plural GW stations 70(1) to 70(3) before the HAPS 20 rotates (for example, see FIG. 4). Before the rotation of the HAPS 20, the direction of the main beam 212f(1) of the directional beam 212(1) of the FL antenna 211(1) faces the GW station 70(1), the FB ratio, which is the gain difference between the main beam 212f(1) and the side lobes 212b(1), is relatively large.

When the HAPS 20 rotates (for example, performs a yaw rotation in a horizontal plane with respect to the vertical direction as the rotation axis) from the state shown in FIG. 26A, the direction of the main beam 212f(1) of the directional beam 212(1) of the FL antenna 211(1) deviates from the GW station 70(1) and faces the direction of the GW station 70(3) (GW3 in the figure) as shown in FIG. 26B.

When the beamforming of the FL antenna 211(1) is controlled so that the direction of the main beam 212f(1) of the directional beam 212(1) shown in FIG. 26B is directed to the direction of the original GW station 70(1), the main beam 212f(1) of the directional beam 212(1) of the FL antenna 211(1) is directed toward the direction of the original GW station 70(1) as shown in FIG. 26C. However, since the gain of the main beam 212f(1) decreases and the gain of the side lobes 212b(1) increases, the FB ratio, which is the gain difference between the main beam 212f(1) and the side lobe 212b(1), deteriorates, the interference of the GW station 70(1) with the feeder link increases, and the SINR of the feeder link deteriorates.

Figure 27:
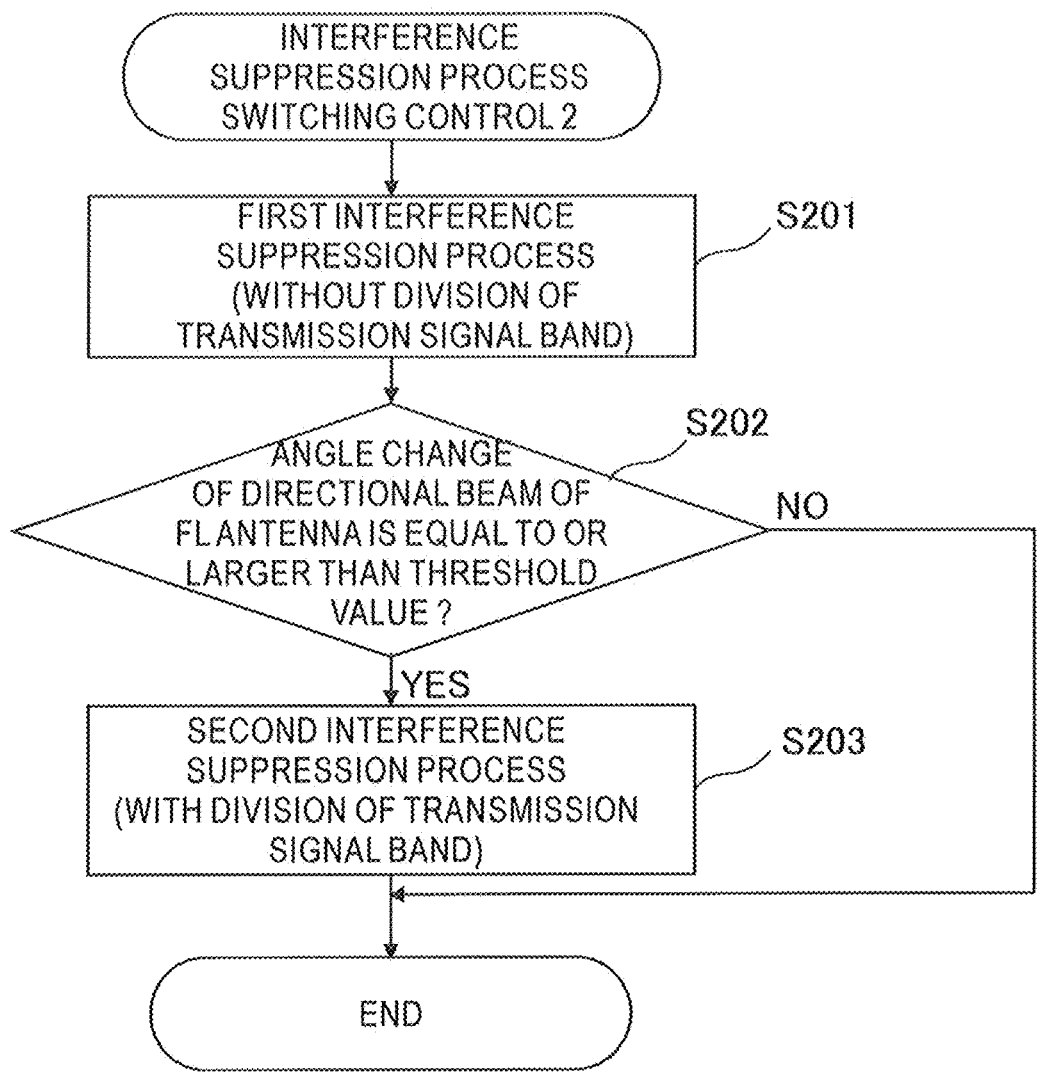
FIG. 27 is a flowchart showing another example of an interference-suppression process switching control according to the present embodiment.

FIG. 27 is a flowchart showing another example of the interference-suppression process switching control according to the present embodiment. In the example of FIG. 27, considering the relationship between the deterioration of the FB ratio due to the beamforming of the FL antenna 211 and the SINR of the feeder link when the HAPS 20 is rotated, the switching control of the interference suppression process is performed as follows. The relay communication station 21 according to the present embodiment normally performs the first interference suppression process in order to reduce a power consumption (S201). Then, when the angle change (for example, θ in FIG. 7) of the directional beam of the FL antenna 211 by the beamforming becomes equal to or larger than a predetermined threshold value (when the FB ratio deteriorates) (YES in S202), a control is performed so as to switch from the first interference suppression process during the normal operation, in which the transmission signal band FB of the feeder link is not divided, to the second interference suppression process with a high interference suppression effect, which is performed for each of the divided frequency bands that are set by dividing the transmission signal band FB of the feeder link into multiple bands (S203). By this switching control, it is possible to effectively suppress the interference between the feeder links that increases during the rotation of the HAPS 20 and the beamforming control.

Figure 28:
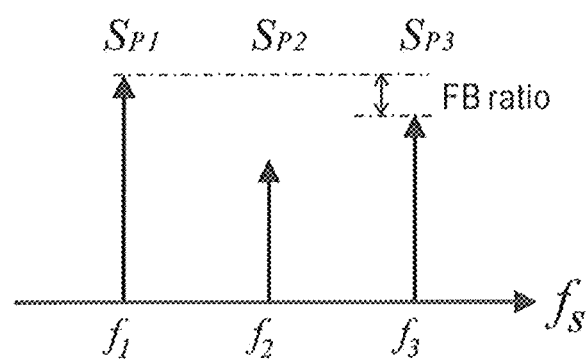
FIG. 28 is an illustration showing an example of deterioration of the ratio of the reception level of the pilot signal corresponding to the FB ratio of the FL antenna.

FIG. 28 is an illustration showing an example of deterioration of the ratio of the reception level of the pilot signal corresponding to the FB ratio of the FL antenna 211(1). As shown in FIG. 28, the deterioration of the FB ratio, which is caused by the beamforming of the FL antenna 211 when the HAPS 20 is rotated, corresponds to the deterioration of the ratio of the reception level between the plural pilot signals $S_{P1}$ to $S_{P3}$ transmitted from the plural GW stations 70(1) to 70(3). For example, the FB ratio in FIG. 26C corresponds to the ratio of the reception level [dB] of the pilot signal $S_{P1}$ from the GW station 70(1) in FIG. 28 to the reception level [dB] of the pilot signal $S_{P3}$ from the GW station 70(1).

Figure 29:
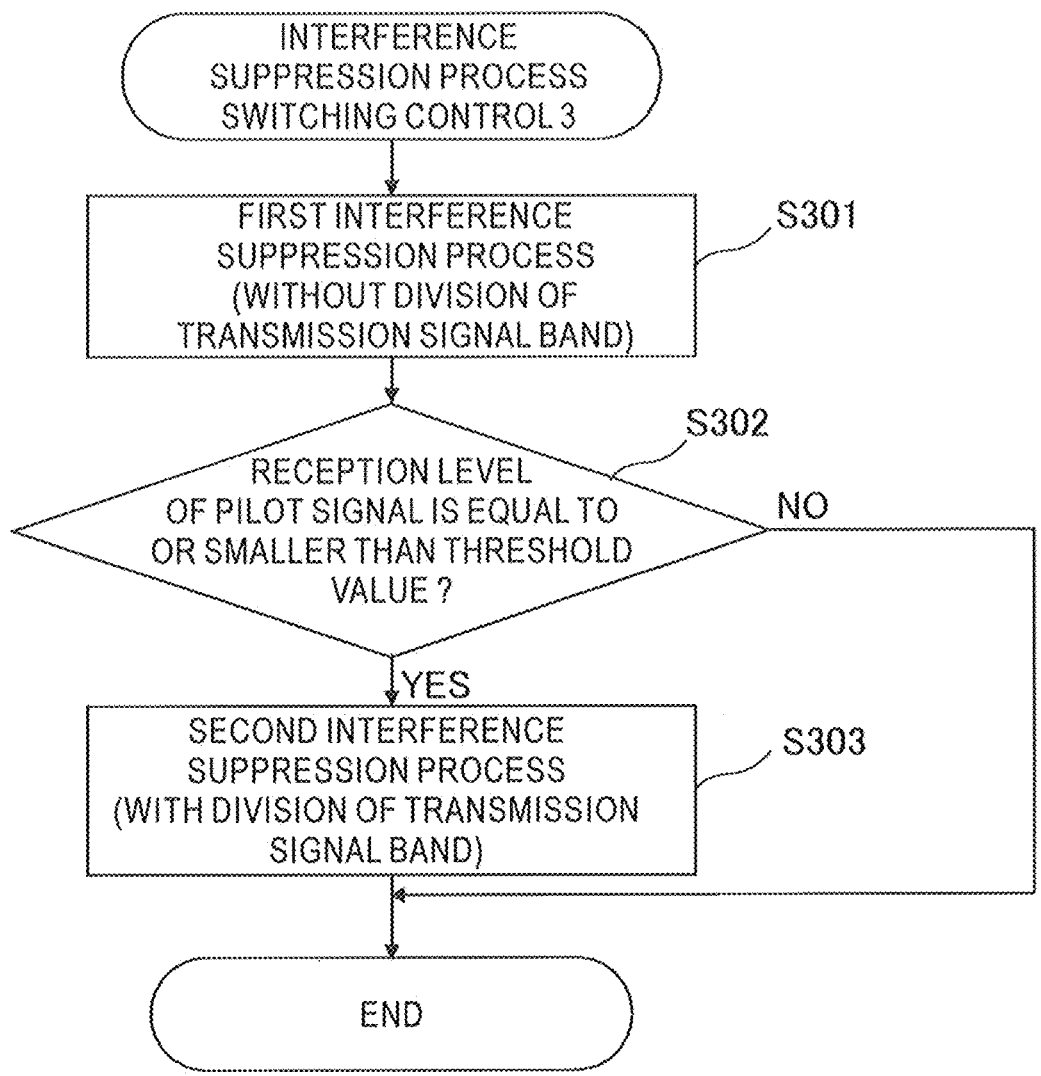
FIG. 29 is a flowchart showing yet another example of an interference-suppression process switching control according to the present embodiment.

FIG. 29 is a flowchart showing yet another example of the interference-suppression process switching control according to the present embodiment. In the example of FIG. 29, considering that the deterioration of the FB ratio, which is caused by the beamforming of FL antenna 211 when the HAPS 20 rotates, corresponds to the deterioration of the ratio of the reception level between the plural pilot signals $S_{P1}$ to $S_{P3}$ transmitted from the plural GW stations 70(1) to 70(3), the switching control of the interference suppression process is performed as follows. The relay communication station 21 according to the present embodiment normally performs the first interference suppression process in order to reduce a power consumption (S301). Then, when a reception level ratio (difference in reception level) between the plural pilot signals $S_{P1}$ to $S_{P3}$ transmitted from the plural GW stations 70(1) to 70(3) becomes equal to or smaller than a predetermined threshold value (when the FB ratio deteriorates) (YES in S302), the control is performed so as to switch from the first interference suppression process during the normal operation, in which the transmission signal band FB of the feeder link is not divided, to the second interference suppression process with a high interference suppression effect, which is performed for each of the divided frequency bands that are set by dividing the transmission signal band FB of the feeder link into multiple bands (S303). By this switching control, it is possible to effectively suppress the interference between the feeder links that increases during the rotation of the HAPS 20 and the beamforming control.

Figure 30:
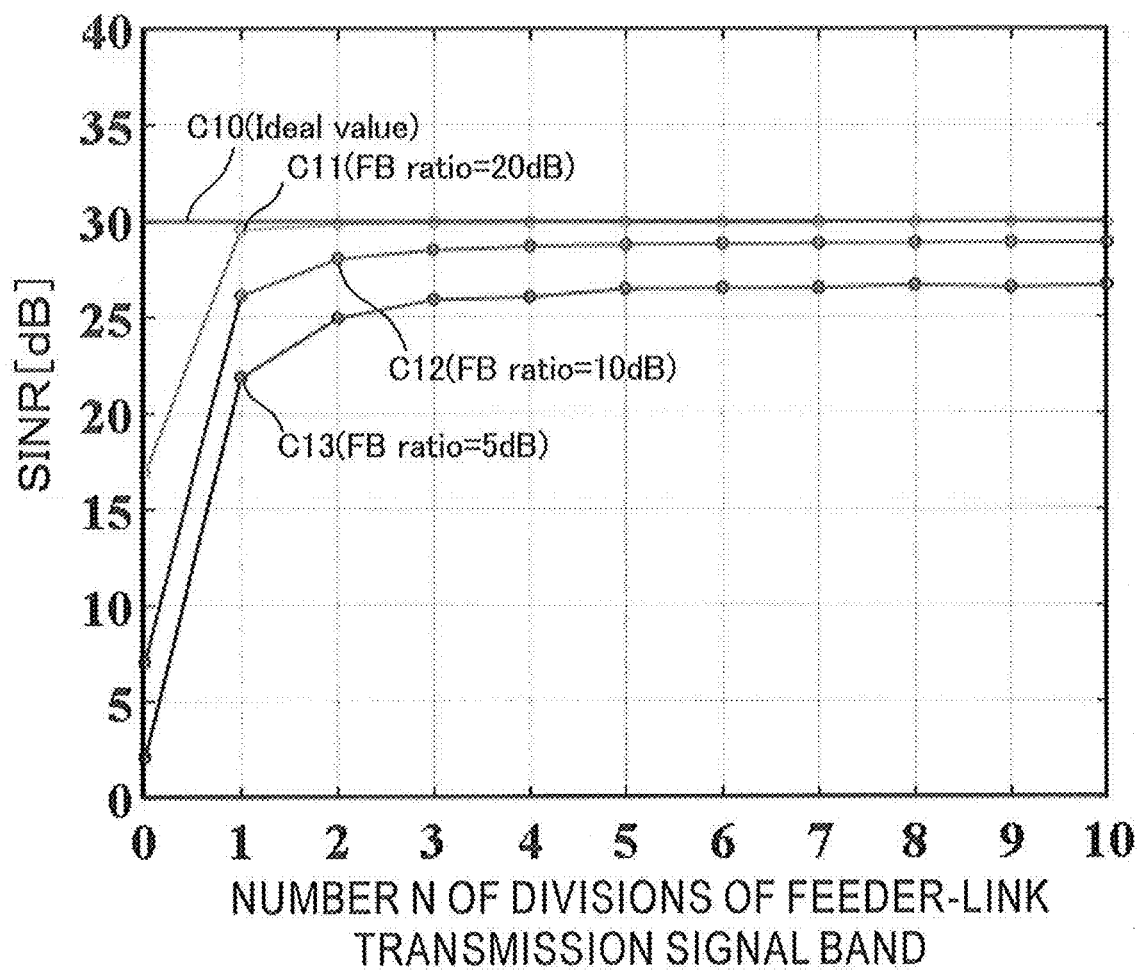
FIG. 30 is a graph showing an example of a computer simulation result in which a relationship between the number of divisions N of the transmission signal band of the feeder link and the SINR is obtained at each of the plural FB ratios.

FIG. 30 is a graph showing an example of a computer simulation result in which the relationship between the number of divisions N of the transmission signal band FB of the feeder link and the SINR [dB] is obtained at each of the plural FB ratios. Table 2 shows the parameters used in the computer simulation of FIG. 30. From FIG. 30, it is found that, when the FB ratio is 5 dB (see C13 in the figure), the SINR can be remarkably improved by the increase in the number of divisions N of the transmission signal band of the feeder link.

TABLE 2

| Evaluation Parameter | Value |
|---|---|
| Number of ground stations (GW stations) | 3 |
| Disposed radius R of ground stations (GW stations) | 100 km |
| Number of antennas of HAPS relay communication station | 3 |
| Disposed radius r of antennas of HAPS relay communication station | 0.5 m |
| Turning radius Rh | 1 km |
| Altitude of HAPS | 20 km |
| Carrier frequency (Transmission frequency) | 3.3 GHz |
| Bandwidth B of transmission signals | 18 MHz |
| S/N ratio | 30 dB |
| Front-back ratio (F/B ratio) of antenna Γ | 5, 10, 20 dB |
| Division number of bandwidth of transmission signals | 0 to 10 |

Figure 31:
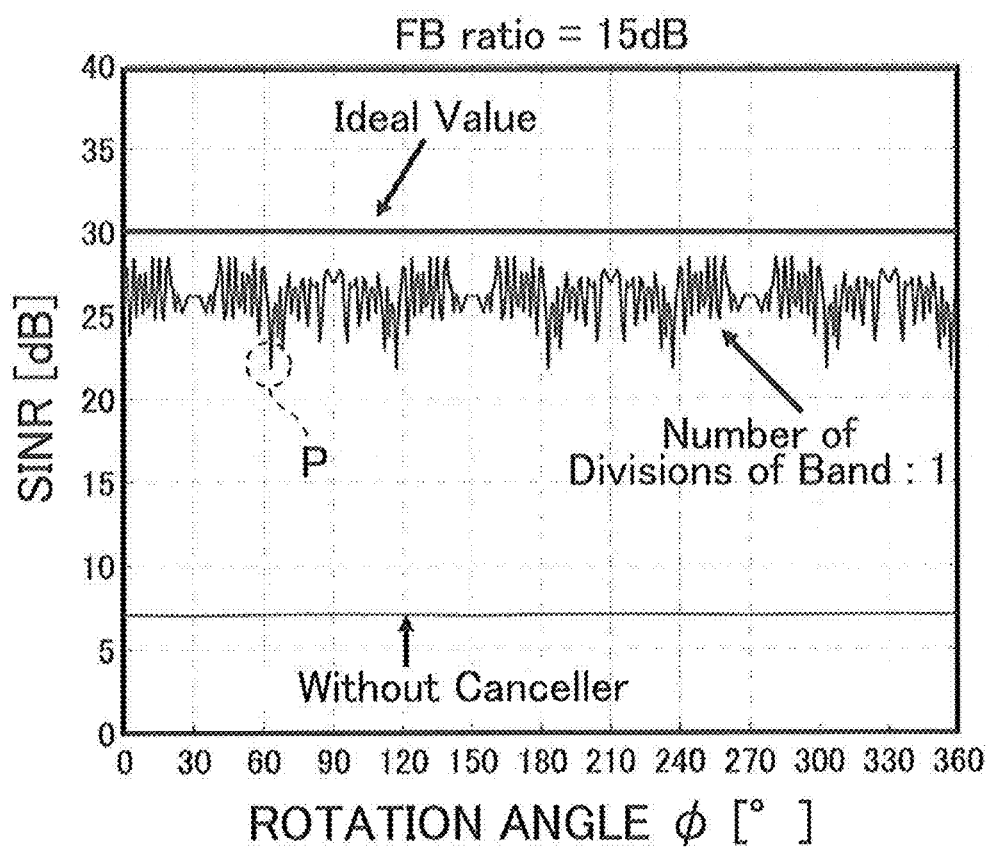
FIG. 31 is a graph showing an example of a computer simulation result in which a relationship between the rotation angle of the HAPS and the SINR is obtained in case that the FB ratio is 15 dB.

FIG. 31 is a graph showing an example of a computer simulation result in which the relationship between the rotation angle φ[°] of the HAPS 20 and the SINR [dB] is obtained in case that the FB ratio is 15 dB. Table 3 shows the parameters used in the computer simulation of FIG. 31 and FIG. 33 described later. As shown in the area P surrounded by a circle with broken lines in FIG. 31, even if the FB ratio is as high as 15 dB, the SINR may deteriorate due to the deterioration of the propagation path of the feeder link depending on the rotation angle φ of the HAPS 20.

TABLE 3

| Evaluation Parameter | Value |
|---|---|
| Number of ground stations (GW stations) | 3 |
| Disposed radius R of ground stations (GW stations) | 100 km |
| Number of antennas of HAPS relay communication station | 3 |
| Disposed radius r of antennas of HAPS relay communication station | 0.5 m |
| Turning radius Rh | 1 km |
| Altitude of HAPS | 20 km |
| Carrier frequency (Transmission frequency) | 3.3 GHz |
| Bandwidth B of transmission signals | 18 MHz |
| S/N ratio | 20 dB |
| Front-back ratio (F/B ratio) of antenna Γ | 15 dB |
| Division number of bandwidth of transmission signals | 0 to 10 |

It is noted that, the ideal values shown in FIG. 30 and FIG. 31 indicate the SINR in case that the interference can be completely eliminated, and are the same values as the S/N ratios shown in Table 2 and Table 3. Specifically, for example, since there are 1200 carrier waves in the bandwidth of 18 MHz in the LTE, the ideal value is the SINR in case that the bandwidth is equally divided into 1200 carriers and the interference is removed by multiplying each carrier wave by the weight estimated at the transmission frequency of each carrier wave. In this case, since the transmission frequency and the estimation frequency match each other, the interference can be completely eliminated.

Figure 32:
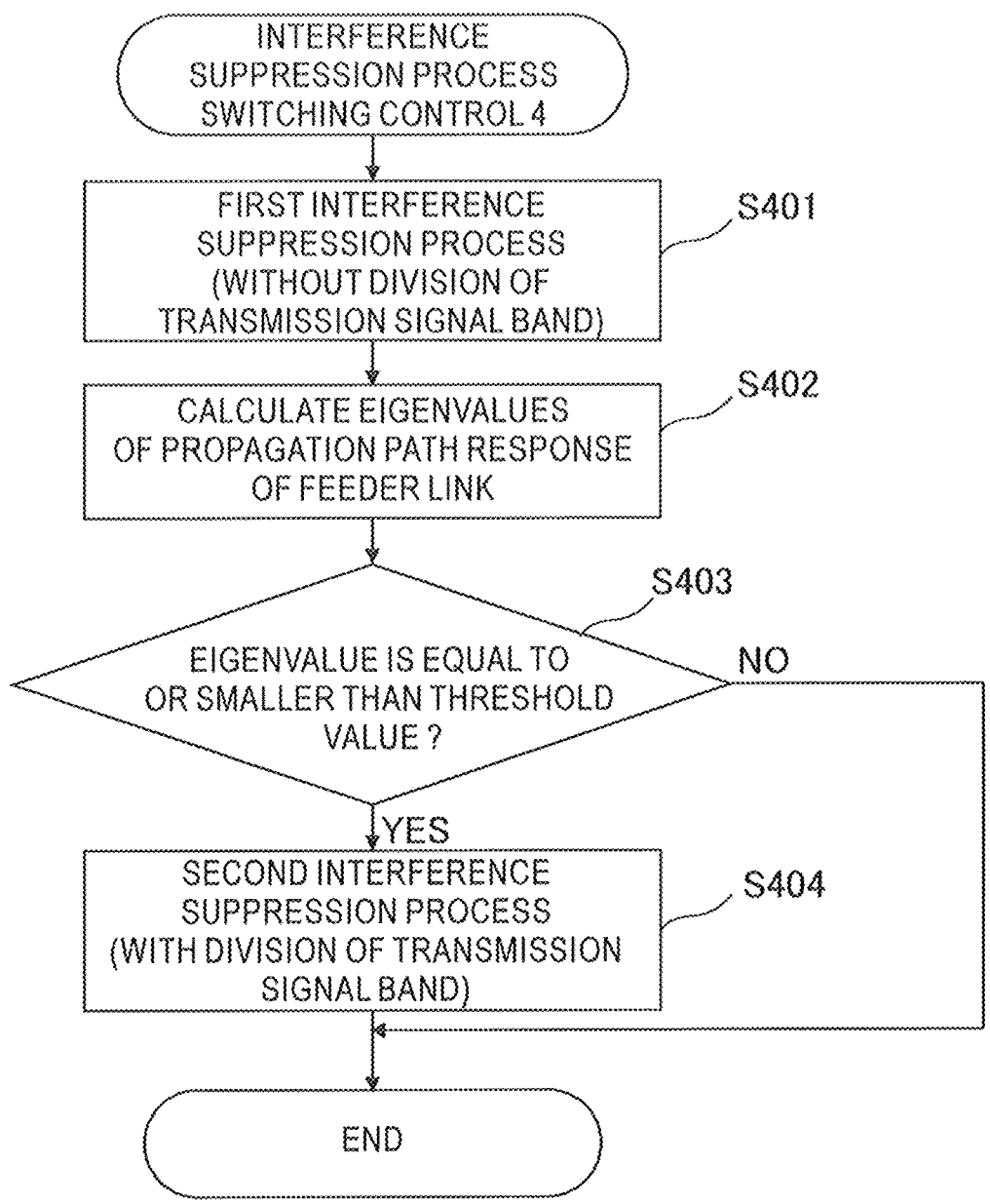
FIG. 32 is a flowchart showing yet another example of an interference-suppression process switching control according to the present embodiment.

FIG. 32 is a flowchart showing yet another example of the interference-suppression process switching control according to the present embodiment. In the example of FIG. 32, considering that the SINR may deteriorate due to the deterioration of the propagation path of the feeder link depending on the rotation angle φ of the HAPS 20 even if the FB ratio is high, the switching control of the interference suppression process is performed as follows. The relay communication station 21 according to the present embodiment normally performs the first interference suppression process in order to reduce a power consumption (S401). Then, plural eigenvalues of propagation path response Hs, which is estimated based on plural pilot signals $S_{P1}$ to $S_{P3}$ transmitted from plural GW stations 70(1) to 70(3), are calculated (S402), and when at least one of the plural eigenvalues becomes equal to or smaller than a predetermined threshold value (YES in S403), the control is performed so as to switch from the first interference suppression process during the normal operation, in which the transmission signal band FB of the feeder link is not divided, to the second interference suppression process with a high interference suppression effect, which is performed for each of the divided frequency bands that are set by dividing the transmission signal band FB of the feeder link into multiple bands (S404). By this switching control, it is possible to effectively suppress the interference between the feeder links that increases during the rotation of the HAPS 20 and the beamforming control.

The eigenvalue of the propagation path response Hs of the feeder link can be calculated, for example, by performing a singular value decomposition of the propagation path response Hs as shown in the following equation (20). The $(\lambda 1)^{1/2}$, $(\lambda 2)^{1/2}$, and $(\lambda 3)^{1/2}$, which are components of the diagonal matrix in equation (20), are eigenvalues.

$$H_s = UDV^H = U \begin{bmatrix} \sqrt{\lambda_1} & 0 & 0 \\ 0 & \sqrt{\lambda_2} & 0 \\ 0 & 0 & \sqrt{\lambda_3} \end{bmatrix} V^H \quad (20)$$

Figure 33:
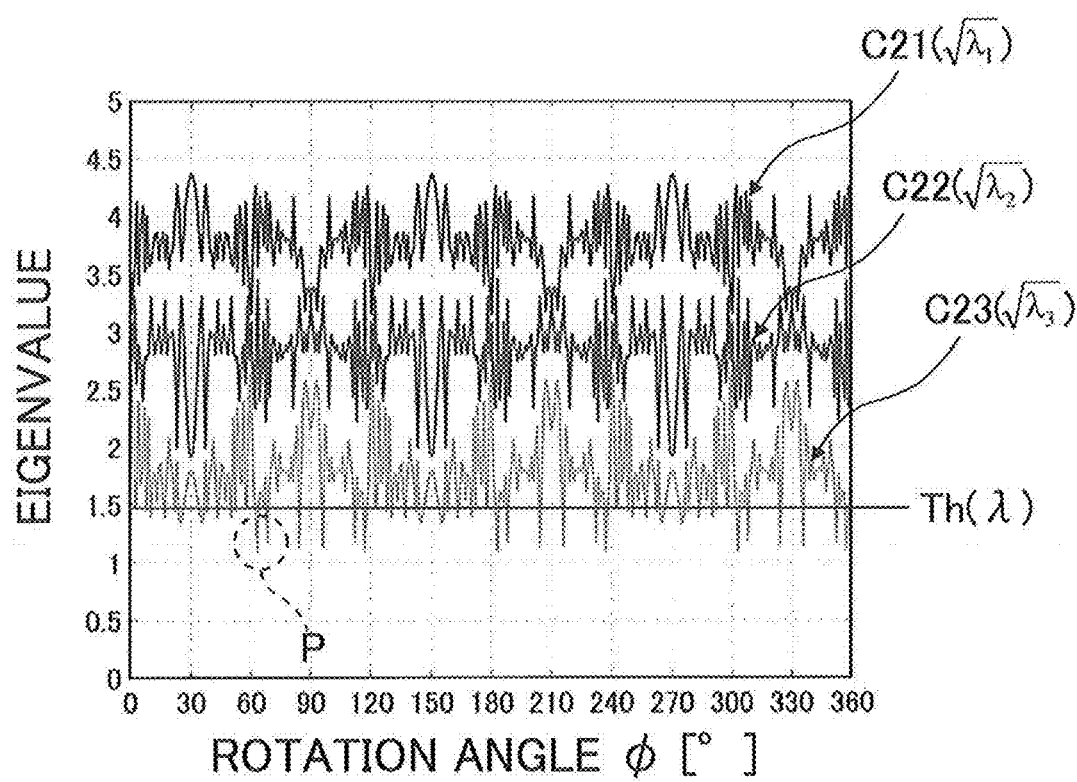
FIG. 33 is a graph showing an example of a computer simulation result in which a relationship between the rotation angle of the HAPS and the eigenvalue of the propagation path response of the feeder link is obtained.

FIG. 33 is a graph showing an example of a computer simulation result in which a relationship between the rotation angle φ[°] of the HAPS 20 and the eigenvalue of the propagation path response H of the feeder link is obtained. C21, C22 and C23 in FIG. 33 show changes in the eigenvalues $(\lambda 1)^{1/2}$, $(\lambda 2)_{1/2}$ and $(\lambda 3)^{1/2}$ of the propagation path response H when the HAPS 20 rotates. Further, Th(λ) in the figure is a threshold value (1.5 in the illustrated example) of the eigenvalue of the propagation path response H, which is used for determining whether to switch the interference suppression process. In the example of FIG. 33, when the rotation angle (for example, the rotation angle with respect to the position shown in FIG. 4) φ of the HAPS 20 shown in the area P (corresponding to the area P in FIG. 31) in the figure is about 65°, the eigenvalue $(\lambda 3)^{1/2}$ of C23 in the figure is equal to or smaller than the threshold Th (λ), so that the control is performed so as to switch from the first interference suppression process during the normal operation, in which the transmission signal band FB of the feeder link is not divided, to the second interference suppression process with a high interference suppression effect, which is performed for each of the divided frequency bands that are set by dividing the transmission signal band FB of the feeder link into multiple bands.

In case that the switching control of the interference suppression process is performed using the eigenvalues of the propagation path response H of the feeder link as shown in FIG. 32 and FIG. 33, although a power consumption is high because the calculation of eigenvalues is needed, the deterioration of SINR can be detected or predicted regardless of whether the FB ratio is high or low. Further, in case that the FB ratio is low, the eigenvalues of the propagation path response H of the feeder link are also low, so that the deterioration of all SINRs can be detected or predicted.

It is noted that, the deterioration of the SINR of the feeder link may also occur due to the increase in the angle at which the main beam direction of the directional beam 212 of the FL antenna 211 deviates from the direction facing the target GW station 70 as described above. Considering the deterioration of SINR in this case, when the angle at which the main beam direction of the directional beam 212 of the FL antenna 211 deviates from the direction facing the target gateway station 70 becomes equal to or larger than a predetermined threshold value, the control may be performed so as to switch from the first interference suppression process during normal operation, in which the transmission signal band FB of the feeder link is not divided, to the second interference suppression process with a high interference suppression effect, which is performed for each of the divided frequency bands that are set by dividing the transmission signal band FB of the feeder link into multiple bands.

Further, in each of the above control examples, when the deterioration of the SINR of the feeder link is eliminated, it may be controlled to return from the second interference suppression process to the first interference suppression process. For example, when the SINR becomes larger than a predetermined threshold value in the example of FIG. 25, it is controlled to switch from the second interference suppression process to the first interference suppression process. When the angle change of the directional beam of the FL antenna 211 by the beamforming (for example, 0 in FIG. 7) becomes smaller than a predetermined threshold value in the example of FIG. 27, it may be controlled to switch from the second interference suppression process to the first interference suppression process. When the reception level ratio (difference in reception level) between the plural pilot signals $S_{P1}$ to $S_{P3}$ transmitted from the plural GW stations 70(1) to 70(3) becomes larger than a predetermined threshold value in the example of FIG. 29, it may be controlled to switch from the second interference suppression process to the first interference suppression process. When the plural eigenvalues of propagation path response Hs estimated based on the plural pilot signals $S_{P1}$ to $S_{P3}$ transmitted from the plural GW stations 70(1) to 70(3) become larger than a predetermined threshold value in the example of FIG. 32, it may be controlled to switch from the second interference suppression process to the first interference suppression process. When the angle at which the main beam direction of the directional beam 212 of the FL antenna 211 deviates from the direction facing the target gateway station 70 becomes smaller than a predetermined threshold value, it may be controlled to switch from the second interference suppression process to the first interference suppression process.

The threshold value (Th12) when switching from the first interference suppression process to the second interference suppression process and the threshold value (Th21) when switching from the second interference suppression process to the first interference suppression process may be the same threshold value (Th12=Th21), or may be different threshold values (Th12>Th21 or Th12>Th21). The threshold value (Th21) when switching from the second interference suppression process to the first interference suppression process may be set so as to switch from the second interference suppression process to the first interference suppression process at the timing when it is determined that the deterioration of the SINR of the feeder link has been stably eliminated.

Figure 34:
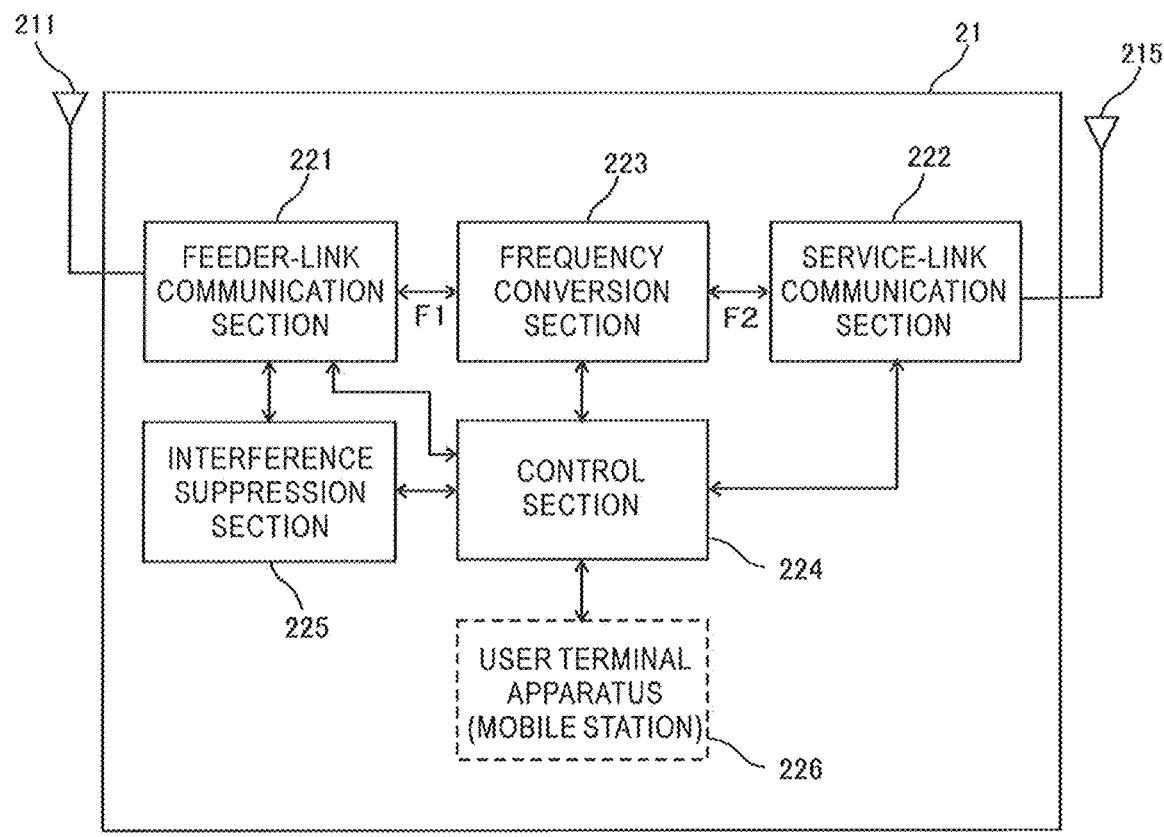
FIG. 34 is an illustration showing an example of a main configuration of a relay communication station of HAPS according to the present embodiment.

FIG. 34 is an illustration showing an example of a main configuration of the relay communication station 21 of the HAPS 20 according to the embodiment. In FIG. 34, the relay communication station 21 is provided with a feeder-link communication section 221, a service-link communication section 222, a frequency conversion section 223, a control section 224 that controls each section, and an interference suppression section 225.

The feeder-link communication section 221 transmits and receives radio signals of a first frequency F1 for feeder link to and from the GW station 70 via the FL antenna 211. Further, the feeder-link communication section 221 receives plural pilot signals transmitted from each of the plural GW stations 70(1) to 70(3), and separates each of the received plural pilot signals by the filter. The service-link communication section 222 transmits and receives radio signals of a second frequency F2 for the service link to and from the terminal apparatus 61 via the service link antenna 115. The frequency conversion section 223 performs a frequency conversion between the first frequency F1 and the second frequency F2 between the feeder-link communication section 221 and the service-link communication section 222. The radio signals relayed by the relay communication station 21 may be transmitted and received, for example, by using the OFMDA communication method conforming to the LTE or LTE-Advanced standard. In this case, good communication quality can be maintained even if multipaths with different radio signal delays occur.

The control section 224 can control each section by executing a program incorporated in advance.

The interference suppression section 225 performs the above-mentioned first interference suppression control, second interference suppression control, and switching control between the first interference suppression control and the second interference suppression control by executing a program incorporated in advance.

It is noted that, in case of receiving control information from the remote control apparatus (control source) of the communication operator of the mobile communication network or transmitting information to the remote control apparatus, a user terminal (mobile station) 226 connected to the control section 224 may be provided. The control section 224, for example, may receive control information transmitted from the remote control apparatus by the user terminal (mobile station) 226 and control each section based on the control information. Herein, the communication between the remote control apparatus and the user terminal (mobile station) 226 may be performed using, for example, the IP address (or telephone number) assigned to each of the remote control apparatus and the user terminal (mobile station) 226.

As described above, according to the present embodiment, it is possible to suppress the interference in the multiple feeder links of the same frequency between the HAPS 20 and the plural GW stations 70(1) to 70(3).

In particular, according to the present embodiment, by dividing the transmission signal band FB of the feeder link into the plural divided frequency bands, estimating the propagation path response, calculating the weight W and processing the interference canceling signal using the weight W for each divided frequency band, the minimum value of the interference suppression amount (interference cancellation amount) ΔIs in the entire transmission signal band FB can be lowered, and the interference suppression effect can be enhanced.

Furthermore, according to the present embodiment, it is possible to suppress the interference between the feeder links while suppressing a power consumption by performing the first interference suppression process, in which the transmission signal band of the feeder link is not divided, during normal operation. In case that the SINR of the feeder link is deteriorated or in case that the SINR of the feeder link is predicted to deteriorate, it is possible to suppress the deterioration of the SINR of the feeder link by switching to the second interference suppression process with a high interference suppression effect, which is performed for each of the divided frequency bands that are set by dividing the transmission signal band of the feeder link into multiple bands.

Further, according to the present embodiment, by transmitting plural pilot signals $S_{P1}$, $S_{P2}$, $S_{P3}$, $S_{P1}'$, $S_{P2}'$, $S_{P3}'$ with frequencies different from each other from each of the plural GW stations 70(1) to 70(3), the path difference between the HAPS 20 and the plural GW stations 70(1) to 70(3) required for the dynamic suppression of interferences in the multiple feeder links can be estimated and grasped up to the range required for implementing, so that the interferences in the multiple feeder links can be suppressed accurately.

Further, according to the present embodiment, it is possible to improve the frequency utilization efficiency of the feeder link while suppressing the decrease in the SINR of the feeder link of the HAPS 20.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

20 HAPS (communication relay apparatus)
21 relay communication station
61 terminal apparatus
70, 70(1) to 70(3) gate way station (GW station)
71, 71(1) to 71(3) antenna for feeder link (GW antenna)
200C, 200C(1) to 200C(7) three dimensional cell
200F, 200F(1) to 200F(7) foot print
211, 211(1) to 211(3) antenna for feeder link (FL antenna)
212, 212(1) to 212(3) antenna directional beam
215 antenna for service link (SL antenna)

The invention claimed is:
1. A system comprising an aerial-staying type communication relay apparatus including a relay communication station that relays a radio communication of a terminal apparatus, the system comprising plural gateway stations that are time-synchronized with each other, the gateway stations transmitting and receiving relay signals different from each other on a same frequency in feeder links between the relay communication station of the aerial-staying type communication relay apparatus and the plural gateway stations,
- wherein the relay communication station comprises a feeder-link communication section that transmits and receives relay signals different from each other on the same frequency in the feeder links to and from the plural gateway stations, and an interference suppression section that suppresses an interference between plural feeder links formed with the plural gateway stations,
- wherein each of the plural gateway stations transmits a pilot signal,
- wherein the feeder-link communication section receives pilot signals respectively transmitted from the plural gateway stations, and separates each of the received plural pilot signals with a filter, and
- wherein the interference suppression section performs a first interference suppression process and a second interference suppression process by switching therebetween,
  - wherein the first interference suppression process suppresses an interference signal that causes an interference by a transmission signal transmitted from the gateway station and received with a directional beam corresponding to another gateway station, by using a propagation path response estimated with one frequency in the transmission signal band as an estimation frequency based on a reception result of the pilot signal without dividing a transmission signal band of the feeder link, and
  - wherein the second interference suppression process divides the transmission signal band of the feeder link into plural divided frequency bands and suppresses the interference signal by using a propagation path response estimated with one frequency in the divided frequency band as an estimation frequency based on the reception result of the pilot signal, for each of the divided frequency bands.

2. The system according to claim 1,
wherein the first interference suppression process:
- estimates plural propagation path responses respectively between the plural gateway stations and an antenna for feeder link of the communication relay apparatus by setting a center frequency of the transmission signal band as an estimation frequency, based on a reception result of the pilot signals respectively received from the plural gateway stations;
- calculates, with respect to each of the plural gateway stations, a weight for suppressing an interference signal that causes an interference by a transmission signal transmitted from the gateway station and received with a directional beam corresponding to another gateway station, based on the plural propagation path responses; and
- subtracts, with respect to each of the plural gateway stations, a reception signal received with the directional beam corresponding to the other gateway station and multiplied by the weight corresponding to the other gateway station, from the reception signal received with the directional beam corresponding to the other gateway station.

3. The system according to claim 1,
wherein the second interference suppression process:
- divides a transmission signal band of the feeder link into plural divided frequency bands, and estimates plural propagation path responses respectively between the plural gateway stations and an antenna for feeder link of the communication relay apparatus with respect to each of the plural divided frequency bands, by setting a center frequency of each of the plural divided frequency bands as an estimation frequency, based on a reception result of the pilot signals respectively received from the plural gateway stations;
- calculates, for each of the divided frequency bands with respect to each of the plural gateway stations, a weight for suppressing an interference signal that causes an interference by a transmission signal transmitted from the gateway station and received with a directional beam corresponding to another gateway station, based on the plural propagation path responses; and
- subtracts, for each of the divided frequency bands with respect to each of the plural gateway stations, a reception signal received with the directional beam corresponding to the other gateway station and multiplied by the weight corresponding to the other gateway station, from the reception signal received with the directional beam corresponding to the other gateway station.

4. The system according to claim 1,
wherein the interference suppression section:
- performs the first interference suppression process in normal times; and
- switches from the first interference suppression process to the second interference suppression process, when an SINR of the feeder link deteriorates or when the deterioration of SINR of the feeder link is predicted.

5. The system according to claim 4,
wherein the feeder-link communication section comprises an antenna for feeder link capable of performing a beamforming that changes an angle of the directional beam; and
wherein the interference suppression section switches from the first interference suppression process to the second interference suppression process, when an angle change of the directional beam of the antenna for feeder link by the beamforming becomes equal to or more than a predetermined threshold value.

6. The system according to claim 4,
wherein the interference suppression section switches from the first interference suppression process to the second interference suppression process, when a reception level ratio between the plural pilot signals transmitted from the plural gateway stations becomes equal to or less than a predetermined threshold value.

7. The system according to claim 4,
wherein the interference suppression section calculates plural eigenvalues of the propagation path response estimated based on the reception results of the plural pilot signals, and switches from the first interference suppression process to the second interference suppression process when at least one of the plural eigenvalues becomes equal to or less than a predetermined threshold value.

8. The system according to claim 4,
wherein the interference suppression section switches from the first interference suppression process to the second interference suppression process, when an angle at which a main beam direction of the directional beam of the antenna for feeder link deviates from a direction facing a target gateway station becomes equal to or more than a predetermined threshold value.

9. The system according to claim 1,
wherein the plural divided frequency bands are defined by equally dividing the transmission signal band of the feeder link.

10. The system according to claim 1,
wherein the plural divided frequency bands are frequency bands defined by unequally dividing the transmission signal band of the feeder link according to a distribution of the interference signals in the transmission signal band of the feeder link.

11. A relay communication station incorporated in an aerial-staying type communication relay apparatus to relay a radio communication of a terminal apparatus, the relay communication station comprising:
a feeder-link communication section that transmits and receives relay signals different from each other on a same frequency in feeder links between the feeder-link communication section and plural gateway stations that are time-synchronized with each other; and
an interference suppression section that suppresses interference between plural feeder links formed with the plural gateway stations,
wherein the feeder-link communication section receives pilot signals respectively transmitted from the plural gateway stations, and separates each of the received plural pilot signals with a filter,
wherein the interference suppression section performs a first interference suppression process and a second interference suppression process by switching therebetween,
wherein the first interference suppression process suppresses an interference signal that causes an interference by a transmission signal transmitted from the gateway station and received with a directional beam corresponding to another gateway station, by using a propagation path response estimated with one frequency in the transmission signal band as an estimation frequency based on a reception result of the pilot signal without dividing a transmission signal band of the feeder link, and
wherein the second interference suppression process divides the transmission signal band of the feeder link into plural divided frequency bands and suppresses the interference signal by using a propagation path response estimated with one frequency in the divided frequency band as an estimation frequency based on the reception result of the pilot signal, for each of the divided frequency bands.

12. An aerial-staying type communication relay apparatus comprising the relay communication station according to claim 11.

13. A feeder-link interference suppression method in a relay communication station that is incorporated in an aerial-staying type communication relay apparatus and relays a radio communication of a terminal apparatus, the feeder-link interference suppression method comprising:

receiving pilot signals respectively transmitted from plural gateway stations that are time-synchronized with each other;
separating each of the received plural pilot signals with a filter; and
performing a first interference suppression process and a second interference suppression process by switching therebetween,
wherein the first interference suppression process suppresses an interference signal that causes an interference by a transmission signal transmitted from the gateway station and received with a directional beam corresponding to another gateway station, by using a propagation path response estimated with one frequency in the transmission signal band as an estimation frequency based on a reception result of the pilot signal without dividing a transmission signal band of the feeder link, and
wherein the second interference suppression process divides the transmission signal band of the feeder link into plural divided frequency bands and suppresses the interference signal by using a propagation path response estimated with one frequency in the divided frequency band as an estimation frequency based on the reception result of the pilot signal, for each of the divided frequency bands.

14. A non-transitory computer readable medium containing software that is executed by a computer or a processor installed in a relay communication station that is incorporated in an aerial-staying type communication relay apparatus and relays a radio communication of a terminal apparatus, the software comprising:
executable code that transmits and receives relay signals different from each other on a same frequency in feeder links between the relay communication station and plural gateway stations that are time-synchronized with each other;
executable code that receives pilot signals respectively transmitted from the plural gateway stations;
executable code that separates each of the received plural pilot signals with a filter; and
executable code that performs a first interference suppression process and a second interference suppression process by switching therebetween,
wherein the first interference suppression process suppresses an interference signal that causes an interference by a transmission signal transmitted from the gateway station and received with a directional beam corresponding to another gateway station, by using a propagation path response estimated with one frequency in the transmission signal band as an estimation frequency based on a reception result of the pilot signal without dividing a transmission signal band of the feeder link, and
wherein the second interference suppression process divides the transmission signal band of the feeder link into plural divided frequency bands and suppresses the interference signal by using a propagation path response estimated with one frequency in the divided frequency band as an estimation frequency based on the reception result of the pilot signal, for each of the divided frequency bands.

* * * * *